(12) United States Patent
Oikawa et al.

(10) Patent No.: US 8,408,660 B2
(45) Date of Patent: Apr. 2, 2013

(54) DISC BRAKE APPARATUS

(75) Inventors: Hirotaka Oikawa, Yokohama (JP); Takuya Obata, Minami-ALPS (JP)

(73) Assignee: Hitachi, Ltd., Tokyo (JP)

( * ) Notice: Subject to any disclaimer, the term of this patent is extended or adjusted under 35 U.S.C. 154(b) by 1055 days.

(21) Appl. No.: 11/892,879

(22) Filed: Aug. 28, 2007

(65) Prior Publication Data

US 2008/0053760 A1 Mar. 6, 2008

(30) Foreign Application Priority Data

Aug. 31, 2006 (JP) .................. 2006-236733

(51) Int. Cl.
  *B60T 13/00* (2006.01)
(52) U.S. Cl. ........................ 303/20; 188/72.8
(58) Field of Classification Search ............... 303/3, 15, 303/16, 20, 9.61, DIG. 1–DIG. 3; 188/72.8
  See application file for complete search history.

(56) References Cited

U.S. PATENT DOCUMENTS

| | | | | |
|---|---|---|---|---|
| 5,148,894 A | * | 9/1992 | Eddy, Jr. ...................... | 188/72.6 |
| 2006/0267402 A1 | * | 11/2006 | Leiter et al. .................... | 303/20 |
| 2007/0062769 A1 | * | 3/2007 | Noh .............................. | 188/265 |

FOREIGN PATENT DOCUMENTS

| | | |
|---|---|---|
| JP | 3-6165 | 1/1991 |
| JP | 5-506196 | 9/1993 |
| JP | 2002-87233 | 3/2002 |
| JP | 2006-17193 | 1/2006 |
| WO | 92/06876 | 4/1992 |

OTHER PUBLICATIONS

Japanese Office Action dated Nov. 24, 2011 in corresponding Japanese Patent Application No. 2007-220210.
Japanese Office Action (with partial English translation) issued Feb. 8, 2012 in corresponding Japanese Patent Application No. 2007-220210.

* cited by examiner

*Primary Examiner* — Xuan Lan Nguyen
(74) *Attorney, Agent, or Firm* — Wenderoth, Lind & Ponack, L.L.P.

(57) ABSTRACT

A disc brake apparatus including a disc brake having a parking brake mechanism operated by an electric motor as a drive source to mechanically hold a piston in a braking position even after the hydraulic pressure is released; and a controller for supplying a predetermined amount of hydraulic pressure from a hydraulic control unit to caliper caliper, based on a parking-brake indicating signal from a parking brake switch and for operating the parking brake mechanism. In a case in which a brake pedal is being operated when a parking-brake indicating signal is input, the parking brake mechanism is operated in a state in which a hydraulic pressure in the caliper is at a predetermined pressure, after the operation of the brake pedal is finished, so as to reduce a hydraulic pressure required for a release of a brake pedal.

16 Claims, 16 Drawing Sheets and# DISC BRAKE APPARATUS

BACKGROUND OF THE INVENTION

The present invention relates to a disc brake used in an automobile, and in particular, a disc brake apparatus in which an electric parking brake mechanism is incorporated.

Generally, a disc brake used in an automobile has: a pair of pads disposed on opposite sides of a disc; and a caliper adapted to move a piston forward, which is slidably disposed in a cylinder having a closed end, to press the pair of pads against and exert a brake force on the disc, when a hydraulic pressure is supplied by operation of a brake pedal. Recently, however, disc brakes further comprising electric parking brake mechanisms have come into practical use. A conventional example of a disc brake of this type is disclosed in Domestic Announcement No. HEI 05-506196 of PCT Application. This disc brake has a parking brake mechanism that uses an electric motor as a drive source disposed outside the cylinder to mechanically hold the piston, which is moved forward by a hydraulic pressure supplied into the caliper from the hydraulic circuit, in a braking position even after the hydraulic pressure is released.

The disc brake with the parking brake mechanism requires that a supply of a hydraulic pressure into the caliper be greater than the hydraulic pressure supplied during the parking brake operation, to ensure a smooth release of the parking brake. It is often the case that a driver is stepping on the brake pedal when operating the parking brake. In such a case, if the parking brake is operated while a hydraulic pressure higher than a predetermined pressure (a hydraulic pressure required to operate the parking brake) is supplied into the caliper by operation of the brake pedal, an even higher hydraulic pressure must be supplied into the caliper from the hydraulic circuit to release the parking brake. In other words, when the hydraulic pressure supplied into the caliper from the hydraulic circuit is required to be increased to a higher level, it takes as much time to reach that level and thus to release the parking brake.

SUMMARY OF THE INVENTION

The present invention is made in view of the above-described conventional problem. An object of the invention is to provide a disc brake apparatus that is capable of engaging a parking brake by application of a constant hydraulic pressure, independent of a hydraulic pressure generated by operation of a brake pedal, so as to reduce an amount of time required to release the parking brake.

To overcome the above-described problem, a disc brake apparatus includes: a pair of pads disposed on opposite sides of a disc; a caliper for moving a piston forward, which is slidably disposed in a cylinder having a closed end, using a hydraulic pressure supplied by operation of a brake pedal, thereby pressing the pair of pads against the disc to exert a brake force; a parking brake mechanism operated by an electric actuator as a drive source to mechanically hold the piston, which has been moved forward by the hydraulic pressure supplied from a hydraulic circuit into the caliper, in a braking position even after the hydraulic pressure is released; and a controller for activating the hydraulic circuit, based on a parking-brake indicating signal, to supply a predetermined amount of hydraulic pressure into the caliper, and for operating the parking brake mechanism to hold the piston in the braking position, wherein, in a case in which the brake pedal is being operated when a parking-brake indicating signal is input to the controller, the controller operates the parking brake mechanism in a state in which a hydraulic pressure in the caliper is at a predetermined pressure, after the operation of the brake pedal is finished.

In a case a hydraulic pressure in the caliper exceeds a predetermined pressure when a parking-brake indicating signal is input to the controller, the controller can control the hydraulic circuit, after the hydraulic pressure is reduced to the predetermined pressure, to maintain the predetermined pressure.

The disc brake apparatus can further comprise a pressure reducing unit for reducing a hydraulic pressure in the caliper, wherein, in a case in which a hydraulic pressure in the caliper exceeds the predetermined pressure when a parking-brake indicating signal is input to the controller, the controller operates the pressure reducing unit to reduce the hydraulic pressure to the predetermined pressure and then controls the hydraulic circuit to maintain the predetermined pressure.

The disc brake apparatus can further comprise a pressure reducing unit for reducing a hydraulic pressure in the caliper, wherein, in a case in which a hydraulic pressure in the caliper exceeds a predetermined pressure when a parking-brake indicating signal is input to the controller, the controller controls the hydraulic circuit so as to maintain a current hydraulic pressure when the hydraulic pressure begins to decrease, and, after operation of the brake pedal is finished, operates the pressure reducing unit to reduce the hydraulic pressure to the predetermined pressure, and then controls the hydraulic circuit to maintain the predetermined pressure.

In a case in which a hydraulic pressure in the caliper is lower than a predetermined pressure, the controller can perform a pressure-increasing control of the hydraulic circuit to supply a predetermined amount of pressure to the caliper.

A hydraulic control unit in a brake system having a mechanism for generating a hydraulic pressure, can be commonly used as said hydraulic circuit.

To overcome the above-described problem, another disc brake apparatus of the present invention is characterized in that calipers are provided at wheels of a vehicle, the calipers being adapted to move forward a piston slidably disposed in a cylinder having a closed end, using a hydraulic pressure supplied by operation of a brake pedal, thereby pressing a pair of pads, which are disposed on opposite sides of a disc, against the disc to exert a brake force; at least one of the calipers provided at the wheels comprising: a parking brake mechanism operated by an electric actuator as a drive source to mechanically hold the piston, which has been moved forward by the hydraulic pressure supplied from a hydraulic circuit into the caliper, in a braking position, even after the hydraulic pressure is released; and a controller connected to a hydraulic-pressure detector for detecting a hydraulic pressure in the caliper having the parking brake mechanism, a pedal-operation detector for detecting operation of the brake pedal, and a parking brake switch for outputting a parking-brake indicating signal, such that the controller activates the hydraulic circuit, based on the parking-brake indicating signal from the parking brake switch, to supply a predetermined amount of hydraulic pressure to the caliper having the parking brake mechanism and also operates the parking brake mechanism to hold the piston in the braking position, wherein, in a case in which operation of the brake pedal is detected by the pedal-operation detector when the parking-brake indicating signal is input from the parking brake switch, the controller operates the parking brake mechanism in a state in which the hydraulic pressure detected by the hydraulic-pressure detector is at a predetermined pressure, after the pedal-operation detector detects termination of the operation of the brake pedal.

In a case in which a hydraulic pressure detected by the hydraulic-pressure detector exceeds a predetermined pressure when a parking-brake indicating signal is input to the controller, the controller of the another disc brake apparatus of the present invention can control the hydraulic circuit, such that the hydraulic pressure is reduced to a predetermined pressure, and then the predetermined pressure is maintained.

The another disc brake of the present invention can further comprise a pressure reducing unit for reducing a hydraulic pressure in the caliper, wherein, in a case in which a hydraulic pressure detected by the hydraulic-pressure detector exceeds a predetermined pressure when a parking-brake indicating signal is input to the controller, the controller activates the pressure reducing unit to reduce the hydraulic pressure to a predetermined pressure and then controls the hydraulic circuit to maintain the predetermined pressure.

The another disc brake apparatus of the present invention can further comprise a pressure reducing unit for reducing a hydraulic pressure in the caliper, wherein, in a case in which a hydraulic pressure detected by the hydraulic-pressure detector exceeds a predetermined pressure when a parking-brake indicating signal is input to the controller, the controller activates the pressure reducing unit to reduce the hydraulic pressure to a predetermined pressure, and then controls the hydraulic circuit to maintain the predetermined pressure.

To overcome the above-described problem, still another disc brake apparatus of the present invention includes: a pair of pads disposed on opposite sides of a disc; a caliper for moving a piston forward which is slidably disposed in a cylinder having a closed end, using a hydraulic pressure supplied by operation of a brake pedal, thereby pressing the pair of pads against the disc to exert a brake force; a parking brake mechanism operated by an electric actuator as a drive source to mechanically hold the piston, which has been moved forward by the hydraulic pressure supplied from a hydraulic circuit into the caliper, in a braking position, even after the hydraulic pressure is released; and a controller for activating the hydraulic circuit, based on a parking-brake indicating signal, to supply a predetermined amount of hydraulic pressure into the caliper, and for operating the parking brake mechanism to hold the piston in the braking position, wherein, in a case in which a hydraulic pressure in the caliper exceeds a predetermined pressure when a parking-brake indicating signal is input to the controller, the piston is not held in the braking position by the parking brake mechanism.

In a case in which a hydraulic pressure in the caliper exceeds the predetermined pressure, the controller of the still another disc brake apparatus of the present invention can operate the parking brake mechanism, after the hydraulic pressure is reduced to the predetermined pressure, to hold the piston in the braking position at the predetermined pressure.

The controller of the still another disc brake apparatus of the present invention can control the hydraulic circuit to maintain the predetermined pressure, after a hydraulic pressure in the caliper is reduced to the predetermined pressure.

In a case in which a hydraulic pressure in the caliper exceeds the predetermined pressure, the controller of the still another disc brake apparatus of the present invention can activate the hydraulic circuit, after the hydraulic pressure is reduced to a reference pressure that is lower than the predetermined pressure, so as to increase the hydraulic pressure to the predetermined pressure, such that the piston is held in the braking position by the parking brake mechanism at the predetermined pressure.

In a case in which a hydraulic pressure in the caliper exceeds the predetermined pressure while the electric actuator is being operated such that the piston is held in the braking position by the parking brake mechanism at the predetermined pressure, the controller of the still another disc brake apparatus of the present invention can stop operation of the electric actuator of the parking brake mechanism.

The still another disc brake apparatus of the present invention can further comprise a pressure reducing unit for reducing a hydraulic pressure in the caliper, wherein, in a case in which a hydraulic pressure in the caliper exceeds a predetermined pressure, the controller operates the pressure reducing unit to reduce the hydraulic pressure to a predetermined pressure, such that piston is held in a braking position by the parking brake mechanism at the predetermined pressure.

After a hydraulic pressure in the caliper is reduced to the predetermined pressure, the controller of the still another disc brake apparatus of the present invention can control the hydraulic circuit to maintain the predetermined pressure.

The still another disc brake apparatus of the present invention can further comprise a pressure reducing unit for reducing a hydraulic pressure in the caliper, wherein, in a case in which a hydraulic pressure in the caliper exceeds the predetermined pressure, the controller activates the pressure reducing unit to reduce the hydraulic pressure to a reference pressure that is lower than the predetermined pressure, and then operates the hydraulic circuit to increase the hydraulic pressure to the predetermined pressure, such that the piston is held in a braking position by the parking brake mechanism at the predetermined pressure.

In a case in which a hydraulic pressure in the caliper exceeds a predetermined pressure when the piston is held in the braking position by the parking brake mechanism at the predetermined pressure, the controller of the still another disc brake apparatus of the present invention can operate the parking brake mechanism to release the piston from the braking position.

In a case in which a hydraulic pressure in the caliper is lower than a predetermined pressure when a parking-brake indicating signal is input to the controller, the controller of the still another disc brake apparatus of the present invention can perform a pressure-increasing control of the hydraulic circuit to supply a predetermined amount of hydraulic pressure into the caliper.

DETAILED DESCRIPTION OF THE PREFERRED EMBODIMENT

Below, the best mode for carrying out the present invention will be described with reference to accompanying drawings.

Figure 1:
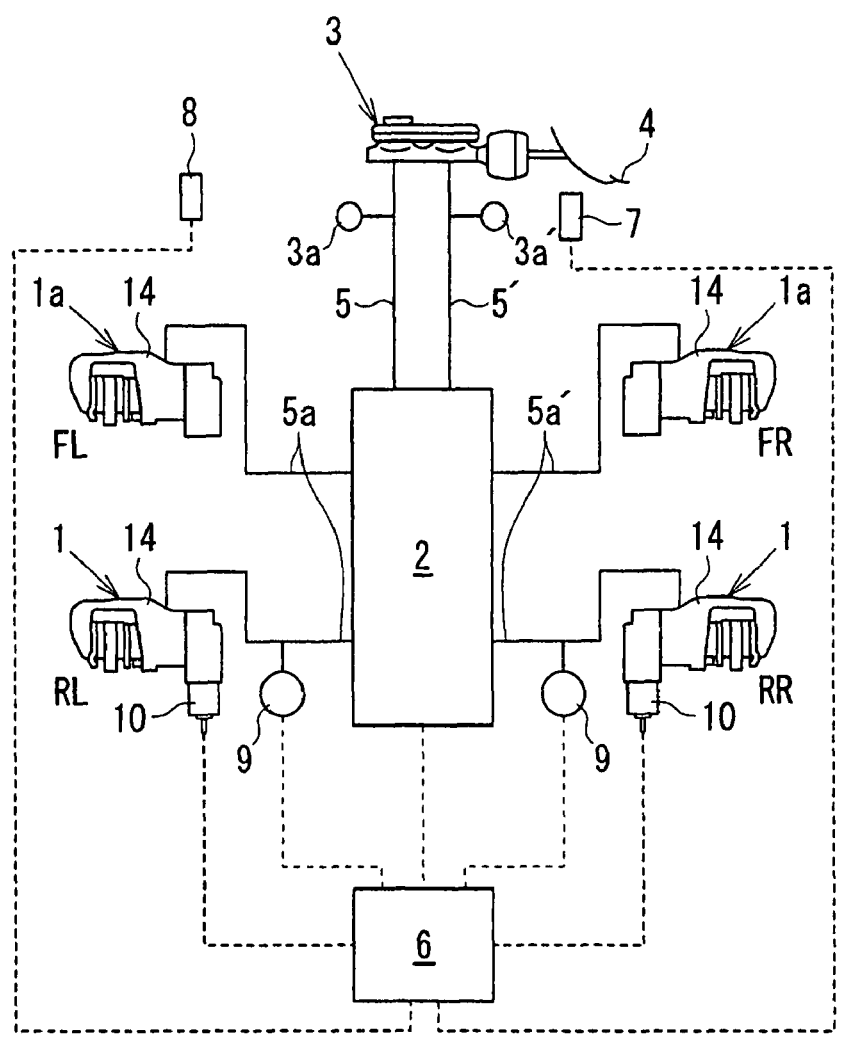
FIG. 1 is a schematic view showing a structure of a brake system including a disc brake apparatus according to the present invention.

FIG. 1 shows an entire view of a brake system including the disc brake apparatus of the present invention. In the figure, reference numerals 1 and 1a denote a disc brake placed at each wheel of a vehicle. In particular, reference numeral 1 denotes a disc brake with an electric parking brake mechanism (hereinafter, referred to as a PKB disc brake) disposed at each of the rear wheels (RL,RR) of the vehicle. Reference numeral 2 denotes a hydraulic circuit for adjusting a hydraulic pressure supplied to the PKB disc brake 1. Reference numeral 3 denotes a master cylinder for generating a hydraulic pressure according to operation of the brake pedal 4. In this embodiment, the master cylinder 3 is of a tandem type. Dual main brake-fluid passages 5 and 5' extending from the master cylinder 3 are connected to the disc brakes 1 and 1a via the hydraulic circuit 2. In the present embodiment, the disc brakes 1 and 1a are connected to respective branch passages 5a and 5a' branched off from the main brake-fluid passages 5 and 5' in an X-type circuit arrangement in which a right front wheel FR and a left rear wheel RL are paired up and a left front wheel FL and a right rear wheel RR are paired up.

Reference numeral 6 is a separate controller (controller) to which signals from a brake lamp switch 7 for detecting operation of a brake pedal 4, a parking brake switch 8 (for example, a push button) for outputting parking-brake indicating signals, and a hydraulic pressure sensor 9 for detecting a hydraulic pressure in each PKB disc brake 1 are input. Each PKB disc brake 1 is provided outside thereof with an electric motor 10 (electric actuator) for operating a parking brake mechanism, which will be described later. The controller 6 is adapted to control the hydraulic circuit 2, based on the input signals, such that the hydraulic pressure in the PKB disc brake 1 reaches a predetermined value, and is also adapted to control operation of the electric motor 10.

Figure 2:
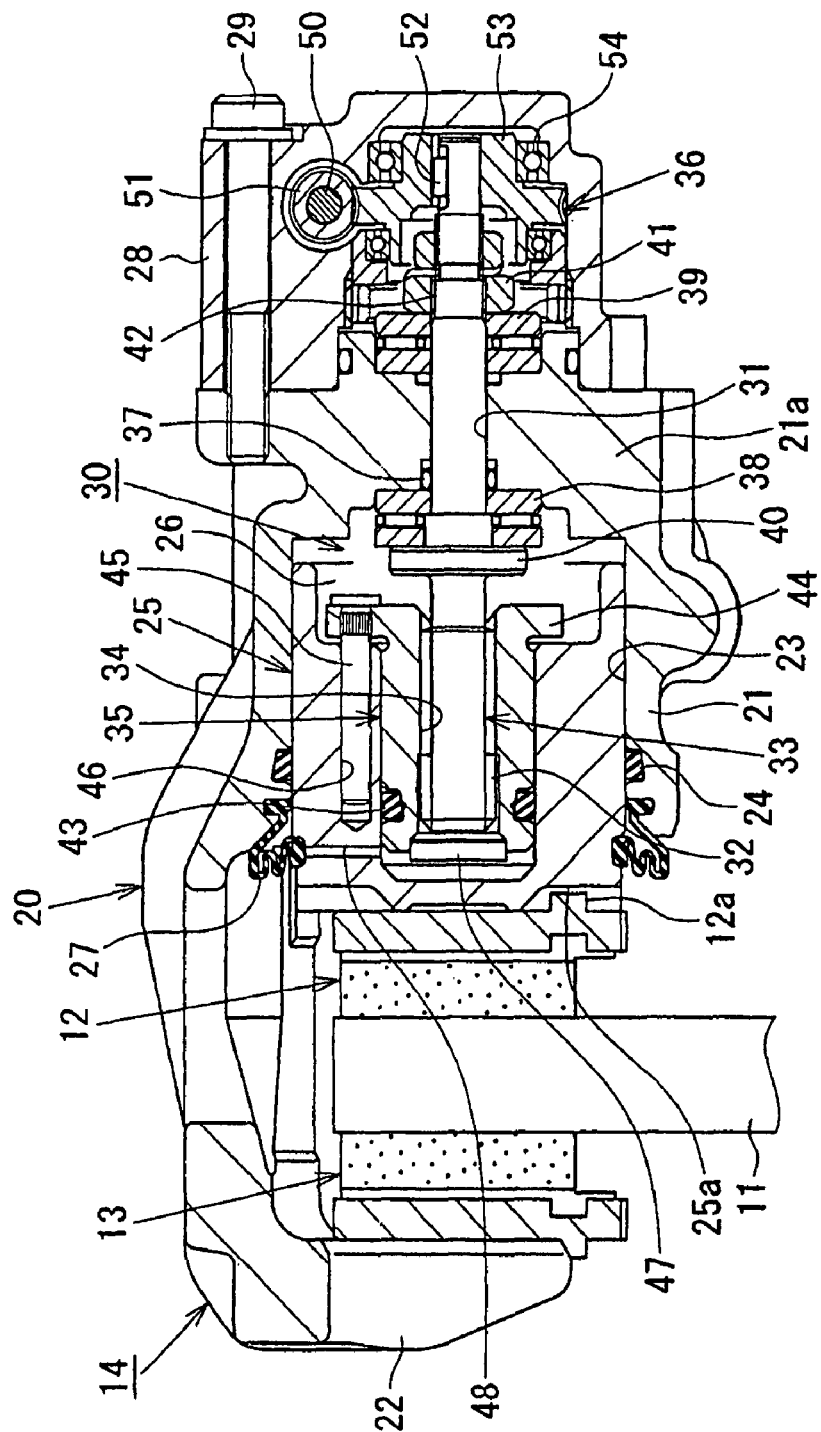
FIG. 2 is a cross-sectional view showing a structure of a disc brake with an electric parking brake mechanism of the disc brake apparatus.
Figure 3:
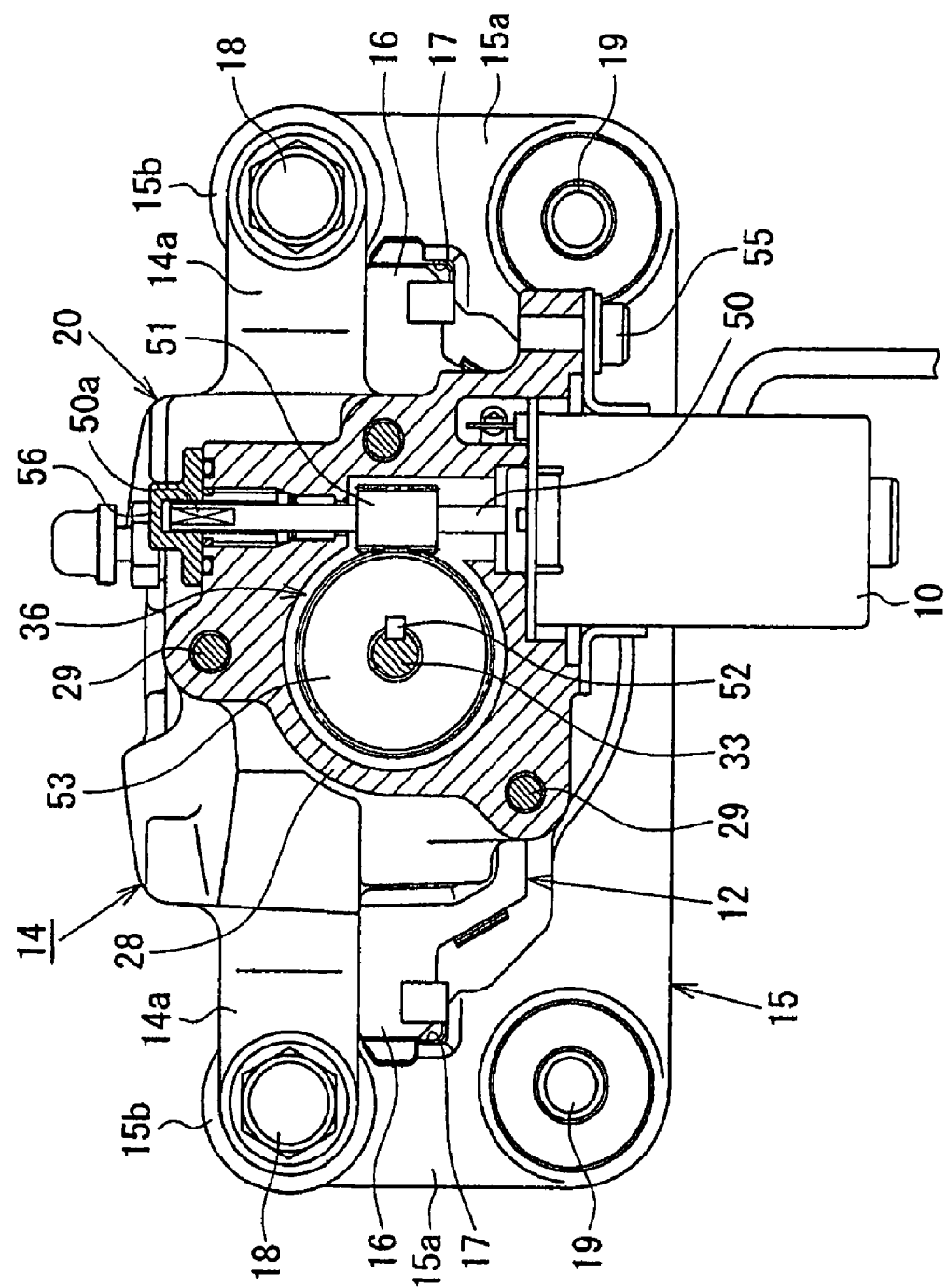
FIG. 3 is a front view showing a part of the disc brake with the electric parking brake mechanism in cross section.

As best shown in FIGS. 2 and 3, the PKB disc brake 1 has: a pair of pads 12 and 13 disposed on opposite sides of a disc rotor 11; and a caliper 14 adapted to press the pair of pads 12 and 13 against the opposite sides of the disc rotor 11 to exert a brake force. The disc brake 1 is of a caliper floating type in which the pair of pads 12 and 13 and the caliper 14 are supported in a carrier 15 (FIG. 3) that is bolted to a non-rotating portion (for example, a knuckle) of the vehicle, so as to be movable in an axial direction of the disc rotor 11.

In more detail, the pads 12 and 13 are slidably supported in the carrier 15 by fitting of left and right ears 16, which are provided on opposite sides of the pads 12 and 13, into guide grooves 17 that are formed in opposite relation inside left and right support columns 15a of the carrier 15 (FIG. 3). The caliper 14 is supported in the carrier 15 by fitting guide pins (not shown), which are attached to left and right arms 14a by bolts 18, into guide holes (not shown) formed in bridges 15b of the carrier 15. In FIG. 3, reference numeral 19 denotes two screw holes provided on left and right sides of the carrier 15, the screw holes being used for bolting the carrier 15 to the non-rotating portion of the vehicle.

A caliper body 20, which is a main body of the caliper 14, comprises: a cylinder portion 21 provided on a proximal side facing the pad (inner pad) 12 on the inboard side of the vehicle; and a claw 22 disposed on a distal side facing the pad (outer pad) 22 on the outboard side of the vehicle. The cylinder portion 21 has a cylinder 23 having a closed end formed therein, the cylinder 23 being open to a side of the inner pad 12 and closed on the other side by a bottom wall 21a. The cylinder 23 is provided therein with a piston 25, such that the piston 25 is capable of sliding via a piston seal 24. In the present embodiment, the piston 25 is cup-shaped and fitted into the cylinder 23, such that a bottom portion of the piston 25 faces the inner pad 12. The piston 25 and the cylinder bottom wall 21a define a hydraulic chamber 26 therebetween. A hydraulic pressure is supplied to the hydraulic chamber 26 from the master cylinder 3 via the branch passages 5a and 5a' branched off from the main brake-fluid passages 5 and 5' (FIG. 1). The piston 25 is prevented from rotating by a recess 25a formed on the bottom surface and a projection 12a formed on a rear surface of the inner pad 12, the recess 25 being engaged with projection 12a. Further, a dust boot 27 is disposed between the bottom portion of the piston 25 and the caliper body 20 to prevent foreign substances from entering the cylinder 23.

In the present embodiment, a housing 28 is fixed to a rear end of the caliper body 20 by a plurality of bolts 29. The housing 28 and the cylinder portion 21 of the caliper body 20 contain a parking brake mechanism 30 through the cylinder bottom wall 21a. The parking brake mechanism 30 mainly comprises: a shaft 33, one end of which extends from the cylinder 23 through a through-hole 31, which is formed in the cylinder bottom wall 21a, into the housing 28, and the other end of which is disposed in a cupped portion of the piston 25 and provided with a male thread 32; a nut 35 disposed in the cupped portion of the piston 25 and provided, on an inner surface thereof, with a female thread 34 that is engaged with the male thread 32 of the shaft 33; and a gear mechanism (speed reduction mechanism) 36 disposed in the housing 28 and driven by the electric motor 10 (FIG. 1) to rotate the shaft 33. A seal member 37 is disposed on an inner surface of the through-hole 31 of the cylinder bottom wall 21a to seal a clearance between the inner surface and the shaft 33. In this way, liquid tightness of the hydraulic chamber 25 in the cylinder 23 is maintained.

The shaft 33 is disposed along an axis of the cylinder 23 and is rotatably supported at an intermediate portion thereof by two bearings (thrust bearings) 38 and 39 that are disposed on opposite sides of the cylinder bottom wall 21a. The shaft 33 has: a flange 40 at an intermediate portion thereof, the flange 40 being capable of abutting against the bearing 38 disposed in the cylinder 23; and a threaded portion 42 on one end thereof extending into the housing 28, such that a double nut 41 can be engaged with the threaded portion 42. The shaft 33, having the double nut 41 tightened around the threaded portion 42, is fixedly constrained with respect to the two bearings 38 and 39 in the axial direction.

The nut 35, which is engaged with the shaft 33, is slidably fitted into an inner surface of the piston 25 via a seal member 43. Further, the nut 35 is prevented from rotating by a slidably fitted pin 45, which extends in the axial direction and is planted in a flange 44 formed at a rear end of the nut 35, into an axial pin hole 46 formed in the piston 25. The nut 35 is adapted to move linearly as the shaft 33 rotates, so as to bring the flange 44 into contact with a rear end of the piston 25, thereby exerting a pressing force onto the piston 25 in its forward-moving direction. The nut 35 has a cover plate 47 fitted into an opening formed at a tip of the nut 35. The piston 25 has an air vent hole 48 for venting any air between an inner bottom of the piston 25 and the tip of the nut 35 including the cover plate 47, the air vent hole 48 being formed through the piston 25 in a radial direction.

The gear mechanism 36 for rotating the shaft 33 comprises: a worm 51 fixed to a rotating shaft 50 of the electric motor 10; and a worm wheel 53 non-rotatably attached via a key 54 to an end of the shaft 35 and meshed with the worm 51. The worm wheel 53 is rotatably supported by the housing 28 via a pair of front and rear bearings 54. In this embodiment, as is best shown in FIG. 3, the electric motor 10 is fixed by a bolt 55 to a lower side of an outer surface of the housing 28. The rotating shaft 50 of the electric motor 10 extends across the housing 28 from a bottom side in an upward direction. The rotating shaft 50 extends through the housing 28, such that a tip of the rotating shaft 50 projects (upward) from the housing 28. The projecting tip 50a is formed to have two flat surfaces that can be readily gripped by a rotating jig. The projecting tip 50a of the shaft 50 having two flat surfaces is normally covered with a cap 56. It is to be noted that FIG. 2 shows different cross sections along upper and lower portions of a central line.

When the above-described PKB disc brake 1 is operated as a normal brake or a service brake, the electric motor 10 is turned off, and a hydraulic pressure is supplied from the master cylinder 3 to the hydraulic chamber 26 in the caliper 14 according to operation of the brake pedal 4. Since the electric motor 10 is turned off, the nut 35 does not move. Therefore, only the piston 25 is moved forward to press the inner pad 12 against the disc rotor 11, and the caliper body 20 is moved to the inboard side of the vehicle by the reaction force, which also moves the caliper body 20 to the inboard side of the vehicle, whereby the claw 22 presses the outer pad 13 against the other surface of the disc rotor 11. As a result, the disc rotor 11 is gripped by the pair of pads 12 and 13 to exert a brake force corresponding to the hydraulic pressure. When the hydraulic pressure is released from the hydraulic chamber 26 in this state, the piston 25 is moved backward due to an elastic restoring force of the piston seal 24. In this way, the pads 12 and 13 are moved away from the disc rotor 11 to release the brake.

To operate the parking brake, a control signal is output to the hydraulic circuit 2 from the controller 6 according to operation of the parking brake switch 8, to supply a predetermined amount of hydraulic pressure from the hydraulic circuit 2 to the hydraulic chamber 26 in the caliper 14. This supply of hydraulic pressure moves the piston 25 forward to exert a predetermined amount of braking force in a manner similar to that of the normal braking operation. Almost at the same time as the start of the supply of hydraulic pressure to the hydraulic chamber 26, the electric motor 10 is activated by a command from the controller 6. In this way, the shaft 33 starts rotating by unit of the gear mechanism 36, and the nut 35 moves linearly (forward) to bring the flange 44 of the nut 35 into contact with the rear end of the piston 25, thereby pressing the piston 25 in the forward-moving direction. Subsequently, almost at the same time as the electric motor 10 is stopped, the circuit in the hydraulic circuit 2 is switched by a command from the controller 6 to release the hydraulic pressure from the hydraulic chamber 26. At this time, a large frictional force is generated in an engaging portion between the male thread 32 and the female thread 34 due to an axial force exerted by the piston 25. Since the gear mechanism 36 is irreversible, the shaft 33 is prevented from rotating, and the nut 35 remains fixed. In other words, even after the electric motor 10 is stopped and the hydraulic pressure is released, the piston 25 is mechanically held in a braking position by the parking brake mechanism 30 to thereby engage the parking brake.

To release the parking brake, the electric motor 10 is rotated in a reverse direction almost simultaneously with a supply of hydraulic pressure to the hydraulic chamber 26 from the hydraulic circuit 2. In this way, the shaft 33 is rotated via the gear mechanism 36, so as to urge the nut 35 to move backward. However, until a piston thrust larger than that of the parking brake operation can be obtained and the hydraulic pressure in the hydraulic chamber 26 of the caliper 14 is increased (to a predetermined pressure), the shaft 33 is prevented from rotating due to irreversibility of the male thread 32 and the female thread 34 and irreversibility of the gear mechanism 36. When the hydraulic pressure becomes high enough to exert a piston thrust larger than that of the parking brake operation, the axial force applied to the nut member 37 by the piston 25 decreases rapidly. Accordingly, the shaft 33 rotates, whereby the nut 35 moves backward. Thereafter, rotation of the electric motor 10 is stopped at an instant when the nut 35 is returned to its original position. Subsequently, the hydraulic pressure is released from the hydraulic chamber 26 by the hydraulic circuit 2 to thereby release the parking brake completely.

In case the electric motor 10 breaks down while the parking brake is on, a hydraulic pressure is supplied to the hydraulic chamber 26, and then an appropriate rotating jig is engaged with the projecting tip 50a of the rotating shaft 50 projecting from the housing 28, and the rotating shaft 50 is forcibly rotated from the outside. In this way, the shaft 33 can be rotated via the gear mechanism 36 to thereby move the nut 35 backward and release the parking brake. In other words, the parking brake can be easily released by hand.

Figure 4:
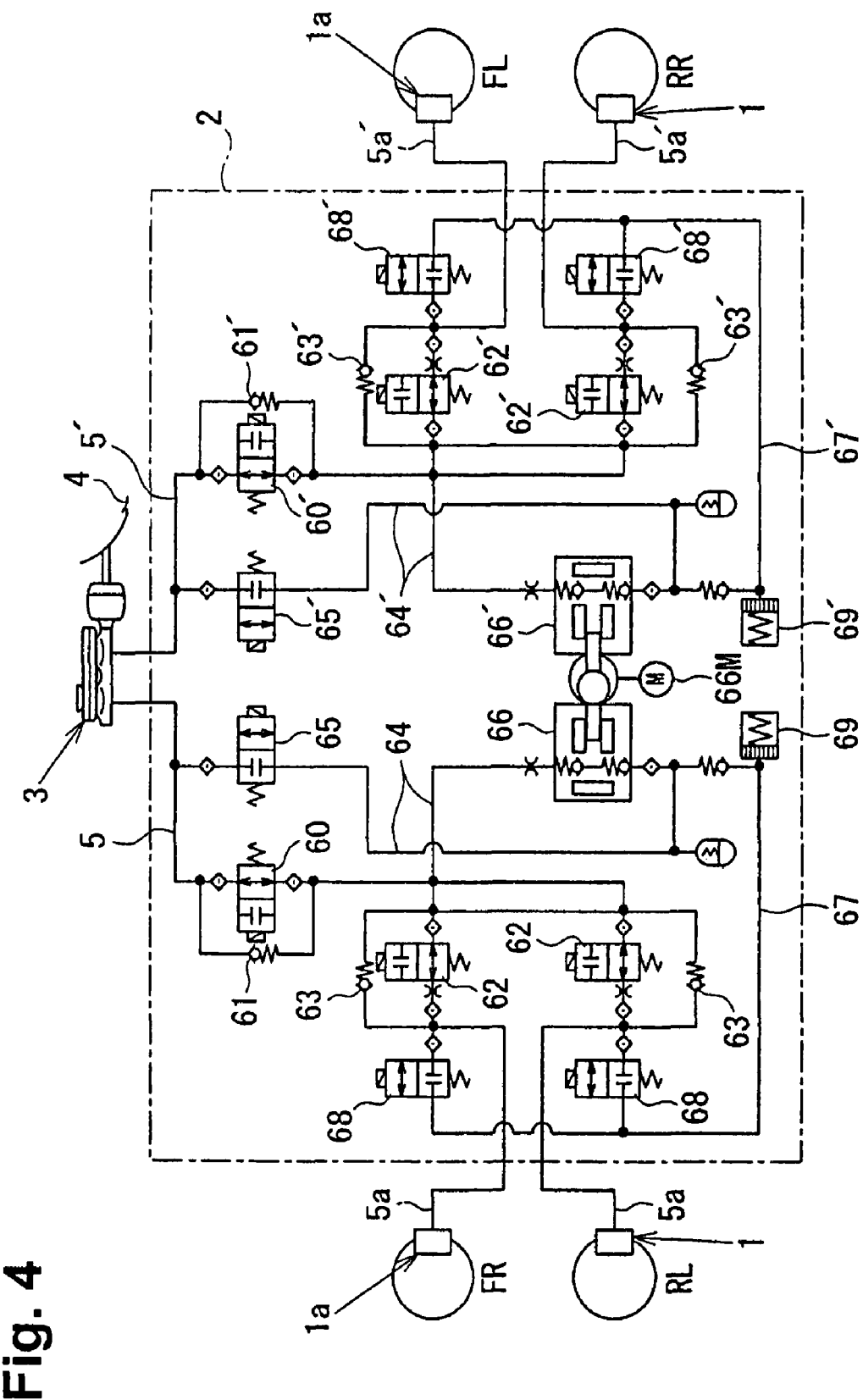
FIG. 4 is a circuit diagram showing a structure of a hydraulic circuit of the disc brake apparatus.

In the present embodiment, a hydraulic control unit in a brake system including a vehicle dynamics control system, an antilock brake system, a traction control system, and so on is commonly used as the hydraulic circuit 2. Therefore, the hydraulic circuit is described below as a hydraulic control unit. As shown in FIG. 4, the hydraulic control unit 2 has main electromagnetic switching valves 60 and 60' that are normally opened and check valves 61 and 61' for preventing a backflow to the master cylinder 3 that are disposed in parallel relation at positions along the dual main brake-fluid passages 5 and 5' extending from the master cylinder 3 to the disc brakes 1. Further, supply electromagnetic switching valves 62 and 62' that are normally opened and check valves 63 and 63' for preventing a backflow to the disc brake 1 are disposed in parallel relation at positions along the branch passages 5a and 5a' branched off from the respective main brake-fluid passages 5 and 5' into the PKB disc brake 1.

Further provided are auxiliary brake-fluid passages 64 and 64' that have: one end thereof connected to positions upstream of the main electromagnetic switching valves 60 and 60' (on the side of the master cylinder 3) along the main brake-fluid passages 5 and 5'; and the other end connected to branch portions of the branch passages 5a and 5a'. The auxiliary brake-fluid passages 64 and 64' are provided with auxiliary electromagnetic switching valves 65 and 65' that are normally closed and pumps 66 and 66'. In this embodiment, the pumps 66 and 66' are commonly operated by one motor 66M. Further provided are brake-fluid return passages 67 and 67' that have: one end connected to positions along branch passages 5a and 5a' to the PKB disc brake 1; and the other end connected to positions on intake sides of the pumps 66 and 66' along the auxiliary brake-fluid passages 64 and 64'. The brake-fluid return passages 67 and 67' are provided with pressure-reducing electromagnetic valves 68 and 68' that are normally closed, and reservoirs 69 and 69'.

The hydraulic control unit 2 with the above-described structure keeps the main electromagnetic switching valves 60 and 60' and the supply electromagnetic switching valves 62 and 62' open during a normal brake operation, as shown in the figure, and keeps the pressure-reducing electromagnetic switching valves 68 and 68' closed. In this way, a hydraulic pressure, which is generated in the master cylinder 3 by operation of the brake pedal 4, is supplied via the main brake-fluid passages 5 and 5' and the branch passages 5a and 5a' into the calipers 14 in the disc brakes 1a and the PKB disc brakes 1 at the rear wheels, so as to exert a brake force corresponding to the hydraulic pressure, as described above.

When a hydraulic pressure to any of the disc brakes 1 and 1a needs to be reduced during a brake operation (an antilock brake control, a vehicle dynamics control, or the like), the supply electromagnetic switching valve 62 or 62' connected to the corresponding disc brake 1 or 1a is closed, and the pressure-reducing electromagnetic switching valve 68 or 68' is opened. In this way, brake fluid in the caliper 14 of the corresponding disc brake 1 or 1a is transmitted via the brake-fluid return passage 67 or 67' and stored in the reservoir 69 or 69', and, at the end of the control, the auxiliary electromagnetic switching valves 65 and 65', which are normally closed, are opened to return brake fluid in the reservoir 69 or 69' to the master cylinder 3.

When a need arises for increasing hydraulic pressure in the disc brake 1 or 1a during a non-braking operation or a braking operation (a traction control, a vehicle dynamics control, or the like), the main electromagnetic switching valve 60 or 60' is closed, and the auxiliary electromagnetic switching valve 65 or 65' is opened. At the same time, operation of the pump 66 or 66' is started by the motor 66M. In this way, brake fluid is supplied to the caliper 14 of the corresponding disc brake 1 or 1a to increase the hydraulic pressure in the caliper 14.

Further, if a need arises for maintaining the hydraulic pressure in any of the disc brakes 1 and 1a, the supply electromagnetic switching valve 62 or 62' connected with the corresponding disc brake 1 or 1a is closed with the main electromagnetic switching valve 60 or 60' being closed (At this time, the pressure-reducing electromagnetic switching valve 68 or 68' is closed). In this way, the hydraulic pressure supplied to the disc brake 1 or 1a is maintained as it is. If, for example, the system does not have lines connected to the check valves 63 and 63' and is structured such that the hydraulic pressures in the disc brakes 1 and 1a can be maintained by closing the supply electromagnetic switching valves 62 and 62', it is not necessary to close the main electromagnetic switching valve 60 or 60'.

To operate the parking brake, a control signal is output to the hydraulic control unit 2 from the controller 6 in response to operation of the parking brake switch 8, to thereby close the main electromagnetic switching valves 60 and 60' and open the auxiliary electromagnetic switching valve 65 and 65'. At the same time, operation of the pumps 66 and 66' is started by the motor 66M to supply hydraulic pressure to the hydraulic chamber 26 in the caliper 14 of the disc brake 1, thereby moving the piston 25 forward to exert a brake force. Meanwhile, the hydraulic pressure is monitored by the hydraulic sensor 9. The controller 6 closes the supply electromagnetic switching valves 62 and 62' connected to disc brakes 1 and 1a, when the hydraulic pressure reaches a predetermined pressure, based on signals from the hydraulic pressure sensor 9. In this way, the hydraulic pressure in the hydraulic chamber 26 of the caliper 14 is maintained at the predetermined hydraulic pressure. As a result, a predetermined brake force can be maintained.

On the other hand, the electric motor 10 of the disc brake 1 is activated by a command from the controller 6 almost at the same time as the start of the supply of hydraulic pressure to the caliper 14 to linearly move (forward) the nut 35 of the parking brake mechanism 30, thereby pressing the piston 25 in the forward-moving direction. The piston 25 is stopped at a predetermined braking position by a prior supply of hydraulic pressure. The piston 25 in this stationary state is pressed by the nut 35 whereby a current through the electric motor 10 peaks and the electric motor 10 is stalled. In this embodiment, the motor current is monitored. When the electric motor 10 is stalled, the electric motor 10 is turned off. Almost at the same time as this turning off of the electric motor 10, the pumps 66 and 66' are turned off by a command from the controller 6. At the same time, the supply electromagnetic switching valves 62 and 62' in the hydraulic control unit 2 are closed, while the pressure reducing switching valves 68 and 68' are opened. In this way, the brake fluid in the calipers 14 returns via the brake-fluid return passages 67 and 67' to the reservoirs 69 and 69', thereby engaging the parking brake, as described above.

The parking brake is released by opening of the supply electromagnetic switching valves 62 and 62' in the hydraulic control unit 2 and closing of the pressure-reducing switching valves 68 and 68' and, at the same time, restarting operation of the pumps 66 and 66'. In this way, a predetermined amount of hydraulic pressure is supplied to the caliper 14. With this supply of hydraulic pressure, the electric motor 10 of the parking brake mechanism 30 is rotated in the reverse direction to move the nut 35 backward, thereby releasing the brake force. Subsequently, the hydraulic pressure is released from the caliper 14 by switching of the circuit in the hydraulic control unit 2. Further, the operation of the pumps 66 and 66' is stopped to terminate the release of the parking brake.

If the parking brake is operated under a condition in which a hydraulic pressure greater than a hydraulic pressure required for parking (a hydraulic pressure required to exert a brake force for maintaining the parking condition) is supplied to the caliper 14 by operation of the brake pedal 4, an even higher hydraulic pressure must be supplied from the hydraulic control unit 2 to the caliper at a time of release of the parking brake, as described above. In order to avoid this inconvenience, in this embodiment, the parking brake is controlled such that it can be engaged always by a predetermined amount of hydraulic pressure. It should be noted that the hydraulic pressure required for parking can be constant or can vary according to a parking condition of the vehicle; for example, the hydraulic pressure required for parking is set to be higher when the vehicle is parked on a incline than when it is parked on a flat road.

Below, a control method for engaging the parking brake while the brake pedal 4 is being operated will be described with reference to FIGS. 5 to 13. For convenience, description of the hydraulic control unit 2 will be made below in terms of only one brake system. In the figures showing graphs, narrow lines represent changes in hydraulic pressure due to operation of the brake pedal.

Figure 5:
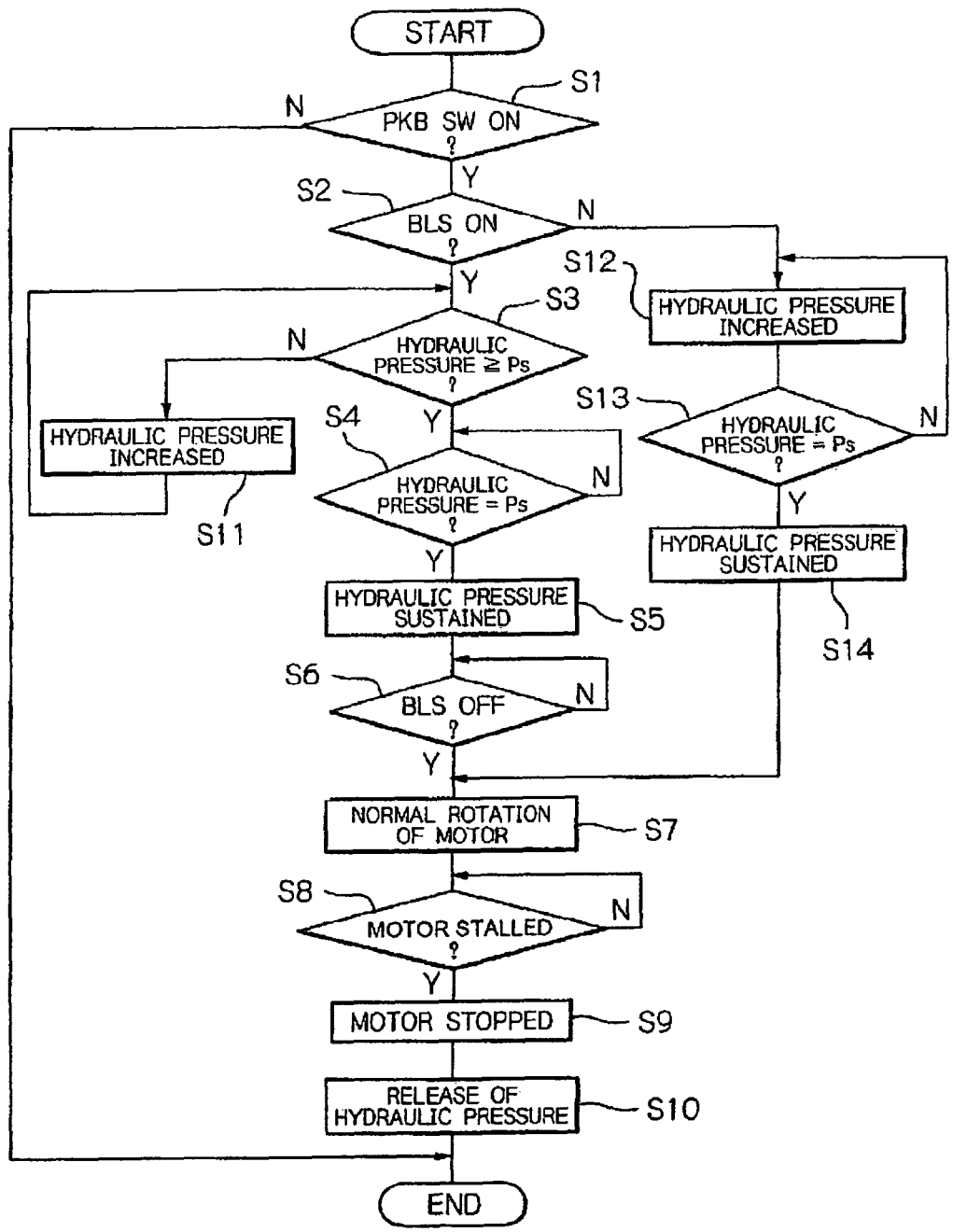
FIG. 5 is a flowchart showing a first example of control of the disc brake apparatus.
Figure 6:
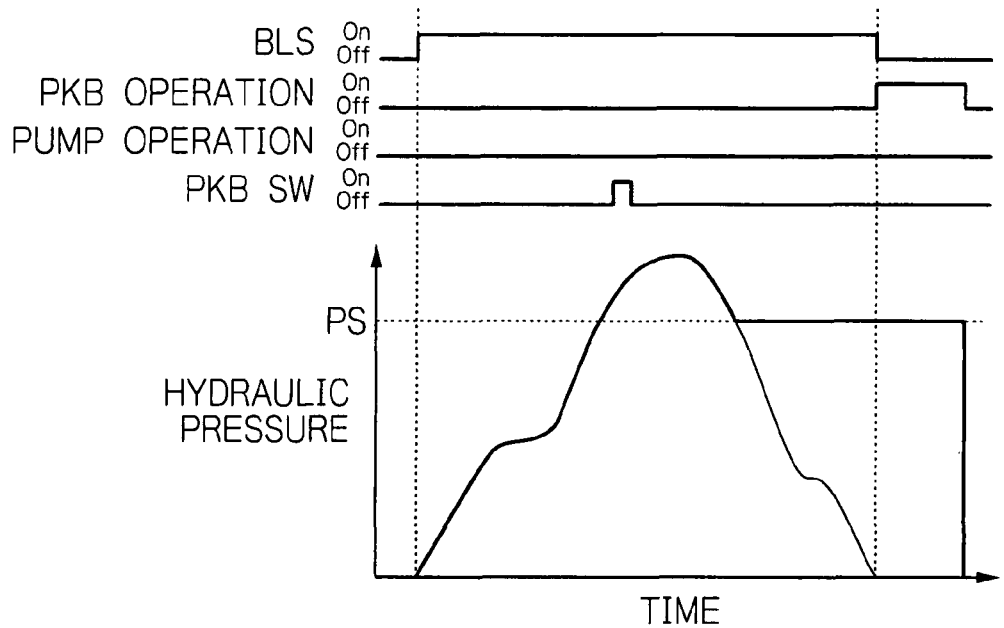
FIG. 6 is a time chart showing an activation timing of each instrument, as the hydraulic pressure in the caliper changes in the first example of control.
Figure 7:
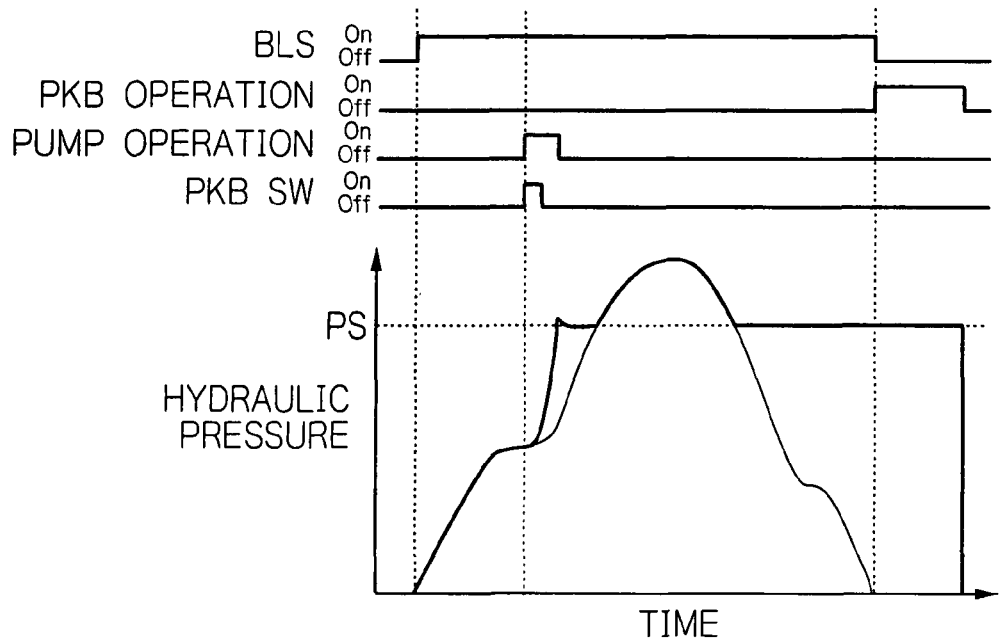
FIG. 7 is a time chart showing another activation timing of each instrument, as the hydraulic pressure in the caliper changes in the first example of control.

FIGS. 5 to 7 show a first example of control in a case in which the brake pedal 4 is being operated when a parking brake indicating signal is input, and a hydraulic pressure is generated in the caliper 14 by the operation of the brake pedal 4. In this case, as shown in FIGS. 5 and 6, a parking brake switch (PKB SW) 8 is turned on in step S1 to input a parking brake indicating signal, and it is then determined in step S2 whether a brake lamp switch (BLS) 7 is turned on. In subsequent step S3, it is determined whether a hydraulic pressure in the caliper 14 is greater than or equal to a predetermined pressure Ps. It is to be noted that the predetermined pressure Ps can be set to the same hydraulic pressure as the hydraulic pressure required for parking or to a hydraulic pressure slightly higher than the hydraulic pressure required for parking, so as to have a certain amount of tolerance. If the hydraulic pressure in the caliper 14 is greater than or equal to the predetermined pressure Ps, it is determined in subsequent step S4 whether the hydraulic pressure is reduced to the predetermined pressure Ps. If the hydraulic pressure is reduced to the predetermined pressure Ps, the main electromagnetic switching valve 60 and supply electromagnetic switching valve 62 are closed in subsequent step S5 to maintain the hydraulic pressure in the caliper 14 at the predetermined pressure Ps.

After it is confirmed in subsequent step S6 that the brake lamp switch 7 is turned off to detect termination of operation of the brake pedal, the electric motor 10 of the disc brake 1 is activated (in normal rotation) in subsequent step S7 to operate the parking brake mechanism 30, thereby moving the nut 35 forward to press the piston 25 in the forward-moving direction. Subsequently, after it is confirmed that the electric motor 10 is stalled (S8), the electric motor 10 is turned off (S9). Further, the pressure-reducing switching valve 68 in the hydraulic control unit 2 is opened to discharge the hydraulic pressure from the caliper 14 (S10), thereby engaging the parking brake.

In this case, the hydraulic pressure generated by operation of the brake pedal 4 is allowed to go down to the predetermined pressure and maintained at this predetermined pressure Ps. This eliminates a need for an active pressure-reducing control by the hydraulic control unit 2 and thus facilitates the control.

If it is confirmed in the above step S3 that the hydraulic pressure in the caliper 14 has not reached the predetermined pressure Ps, the process goes to step S11 in which the main electromagnetic switching valve 60 is closed, and the auxiliary electromagnetic switching valve 65 is opened. At the same time, the pump 66 is operated by the motor 66M to increase the hydraulic pressure in the caliper 14 to the predetermined pressure Ps (FIG. 7). Subsequently, when it is confirmed that the hydraulic pressure has reached the predetermined pressure Ps (S4), the main electromagnetic switching valve 60 and supply electromagnetic switching valve 62 are closed to maintain the hydraulic pressure at the predetermined pressure Ps (S5), and the process goes to the above step S6. If it is confirmed in the above step S2 that the brake lamp switch 7 is not turned on, the process goes to step S12 in which the main electromagnetic switching valve 60 is closed, and the auxiliary electromagnetic switching valve 65 is opened. At the same time, the pump 66 is operated by the motor 66M to increase the hydraulic pressure in the caliper 14. When it is confirmed that the hydraulic pressure has reached the predetermined pressure Ps (S13), the main electromagnetic switching valve 60 and supply electromagnetic switching valve 62 are closed to maintain the hydraulic pressure at the predetermined pressure Ps (S14), and the process goes to the above step S7. In FIG. 7, when the hydraulic pressure in the caliper 14 reaches the predetermined pressure Ps, the hydraulic pressure slightly exceeds the predetermined pressure Ps temporarily and then decreases to the predetermined pressure Ps. This is a transient characteristic of the hydraulic pressure sensor 9 that occurs when the supply electromagnetic switching valve 62 is closed. This characteristic also appears in other control examples, which will be described below.

Figure 8:
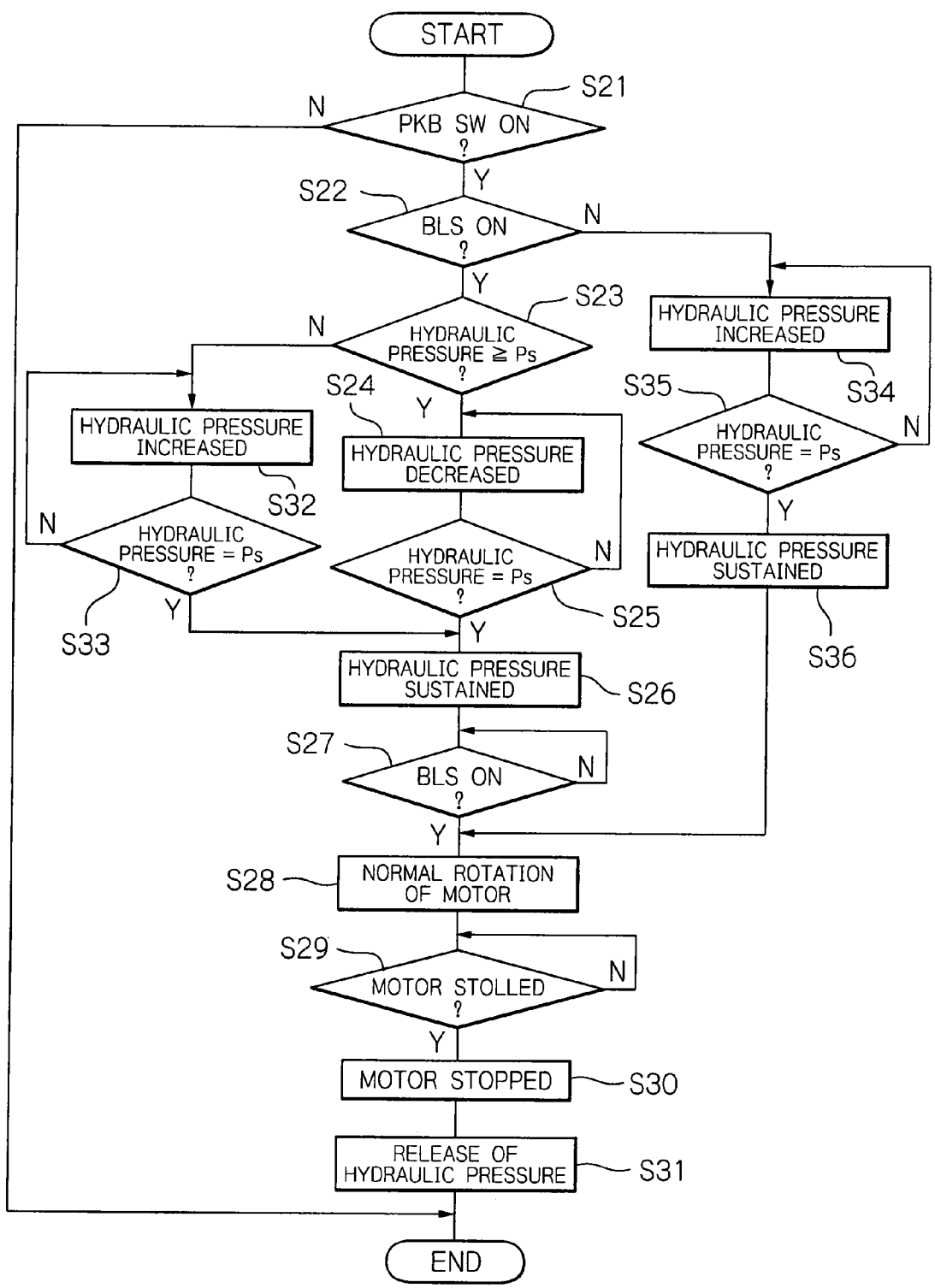
FIG. 8 is a flowchart showing a second example of control of the disc brake apparatus.
Figure 9:
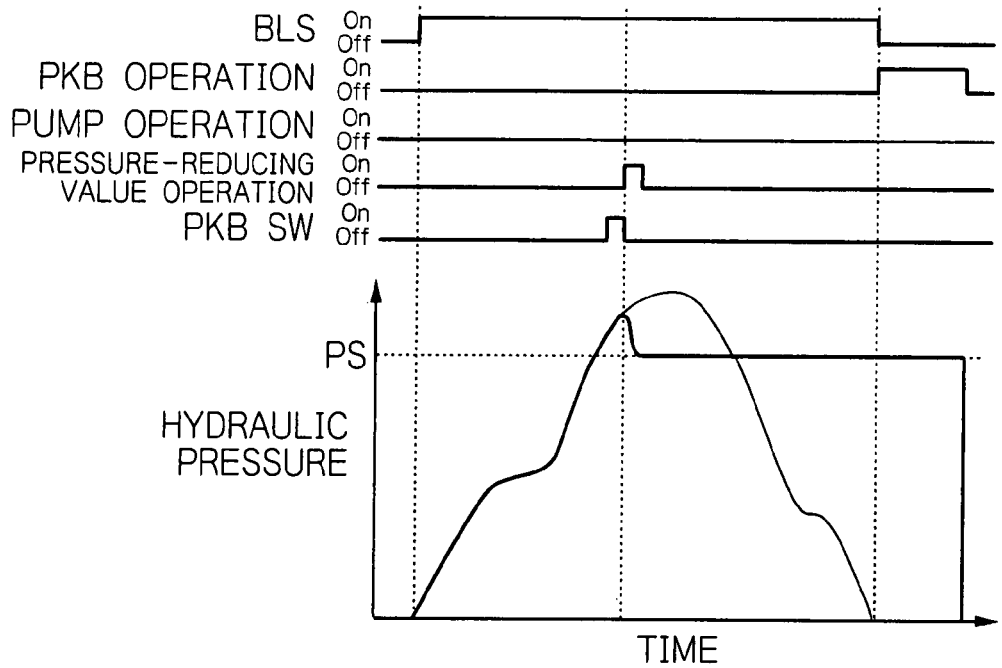
FIG. 9 is a time chart showing an activation timing of each instrument, as the hydraulic pressure in the caliper changes in the second example of control.
Figure 10:
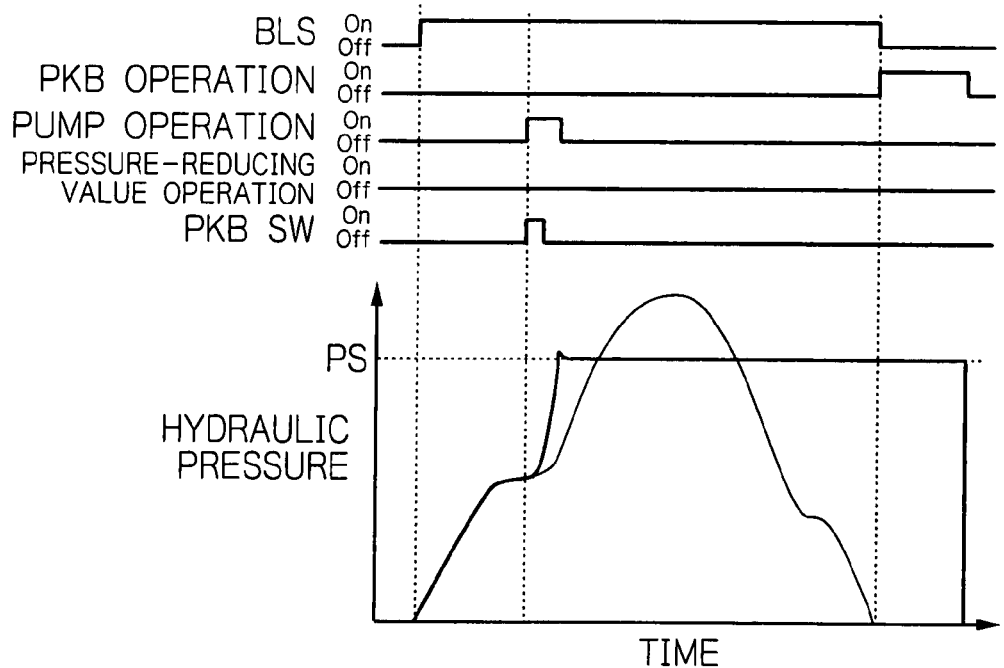
FIG. 10 is a time chart showing another activation timing of each instrument, as the hydraulic pressure in the caliper changes in the second example of control.

FIGS. 8 to 10 show the second example of control in a case in which the brake pedal 4 is being operated when the parking-brake command signal is input, and a hydraulic pressure is generated in the caliper 14 by the operation of the brake pedal 4. In this case, as shown in FIGS. 8 and 9, if the brake switch 7 is on (S22) when the parking brake switch 8 is turned on (S21), it is determined whether the hydraulic pressure in the caliper 14 is greater than or equal to the predetermined pressure Ps (S23), as in the first example of control. If it is determined in step S23 that the hydraulic pressure in the caliper 14 is greater than or equal to the predetermined pressure Ps, then, in subsequent step S24, the supply electromagnetic switching valve 62 in the control unit 2 is closed, while the pressure-reducing switching valve 68, which is a pressure reducing unit, is opened. In this way, the hydraulic pressure in the caliper 14 is reduced. If it is confirmed that the hydraulic pressure in the caliper 14 is reduced to the predetermined pressure Ps in subsequent step S25, the main electromagnetic switching valve 60 and pressure-reducing switching valve 68 are closed in subsequent step S26 to maintain the hydraulic pressure in the caliper 14 at the predetermined pressure Ps.

Thereafter, as in the first example of control, if it is confirmed that the brake lamp switch 7 is turned off (S27), the electric motor 10 of the disc brake 1 is operated in normal rotation (S28). Further, if it is confirmed that the electric motor 10 is stalled (S29), the electric motor 10 is stopped (S30), and the hydraulic pressure is released from the caliper 14 (S31), thereby engaging the parking brake.

In this case, the hydraulic pressure in the caliper 14 is reduced to the predetermined pressure Ps by an active pressure reducing control of the hydraulic control unit 2. Therefore, the parking brake can be engaged promptly.

If it is confirmed in the above step S23 that the hydraulic pressure in the caliper 14 has not reached the predetermined pressure Ps, the process goes to step S32, in which the main electromagnetic switching valve 60 is closed, and the auxiliary electromagnetic switching valve 65 is opened. At the same time, the pump 66 is operated by the motor 66M to increase the hydraulic pressure in the caliper 14 to the predetermined pressure Ps. If it is confirmed in subsequent step S33 that the hydraulic pressure in the caliper 14 has reached the predetermined pressure Ps, the process returns to the above step S26 in which the hydraulic pressure is maintained (FIG. 10). On the other hand, if it is confirmed in the above step S22 that the brake lamp switch 7 is not turned on, the process goes to step S34 in which the main electromagnetic switching valve 60 is closed, and the auxiliary electromagnetic switching valve 65 is opened. At the same time, the pump 66 is operated by the motor 66M to increase the hydraulic pressure in the caliper 14. If it is confirmed that the hydraulic pressure has reached the predetermined pressure Ps (S35), the main electromagnetic switching valve 60 and supply electromagnetic switching valve 62 are closed to maintain the hydraulic pressure at the predetermined pressure Ps (S36), and the process goes to the above step S28.

In the second example of control, when the hydraulic pressure in the caliper 14 is greater than or equal to the predetermined pressure Ps, the hydraulic pressure in the caliper 14 is reduced to the predetermined pressure Ps by switching of the supply electromagnetic switching valve 62 and the pressure-reducing switching valve 68 (pressure reducing unit) in the control unit 2. However, the hydraulic pressure can instead be reduced to a reference pressure Pk (predetermined pressure Ps>reference pressure Pk>about one half of the predetermined pressure Ps) that is lower than the predetermined pressure Ps and then increased to the predetermined pressure Ps and maintained at the predetermined pressure Ps.

Figure 11:
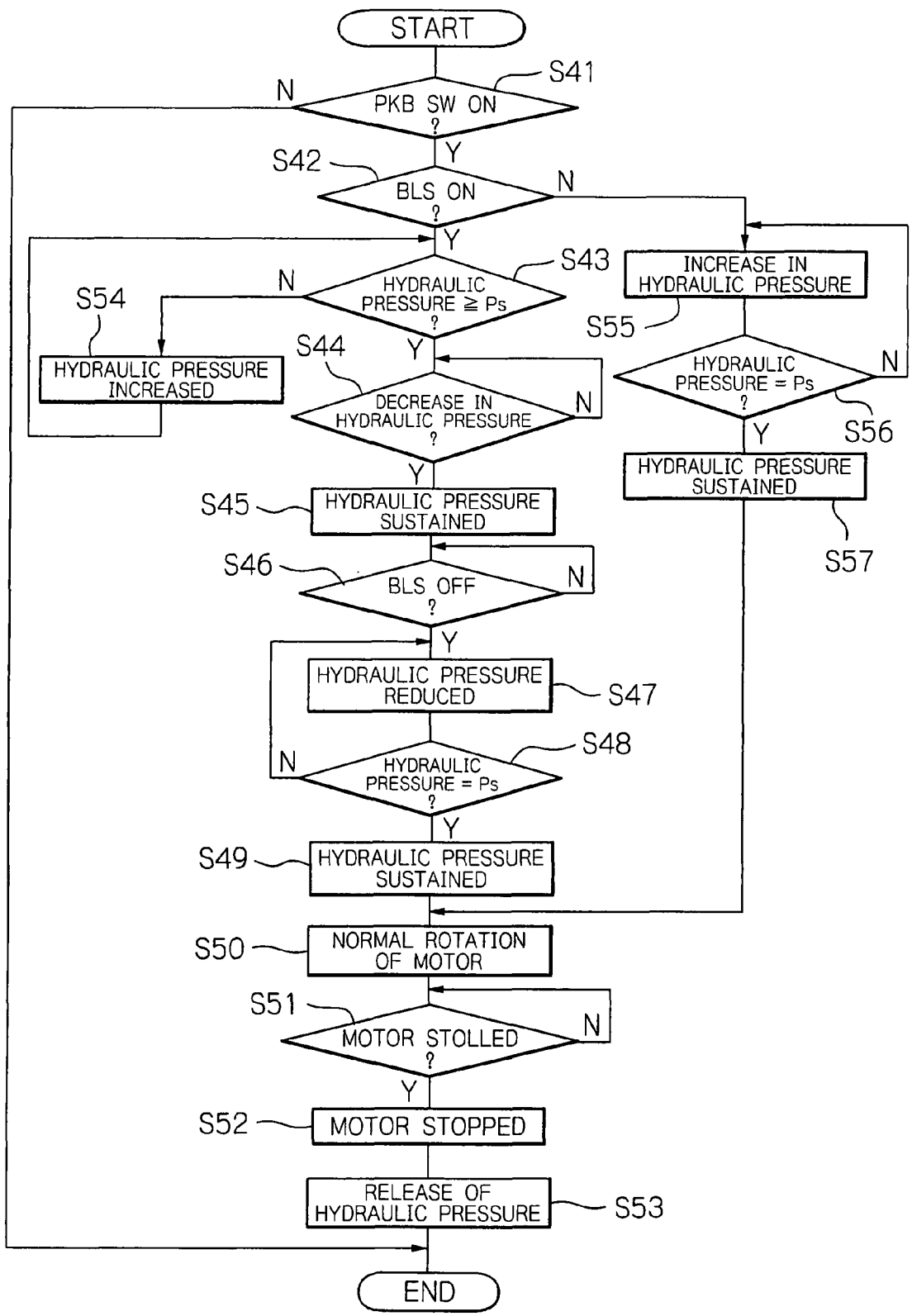
FIG. 11 is a flowchart showing a third example of control of the disc brake apparatus.
Figure 12:
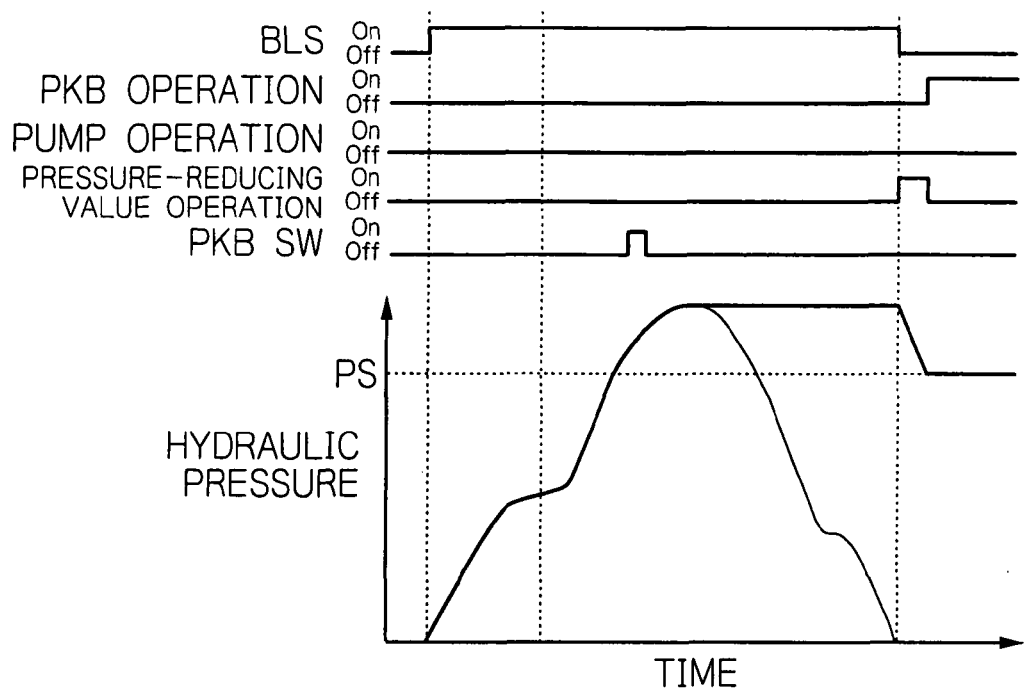
FIG. 12 is a time chart showing an activation timing of each instrument, as the hydraulic pressure in the caliper changes in the third example of control.
Figure 13:
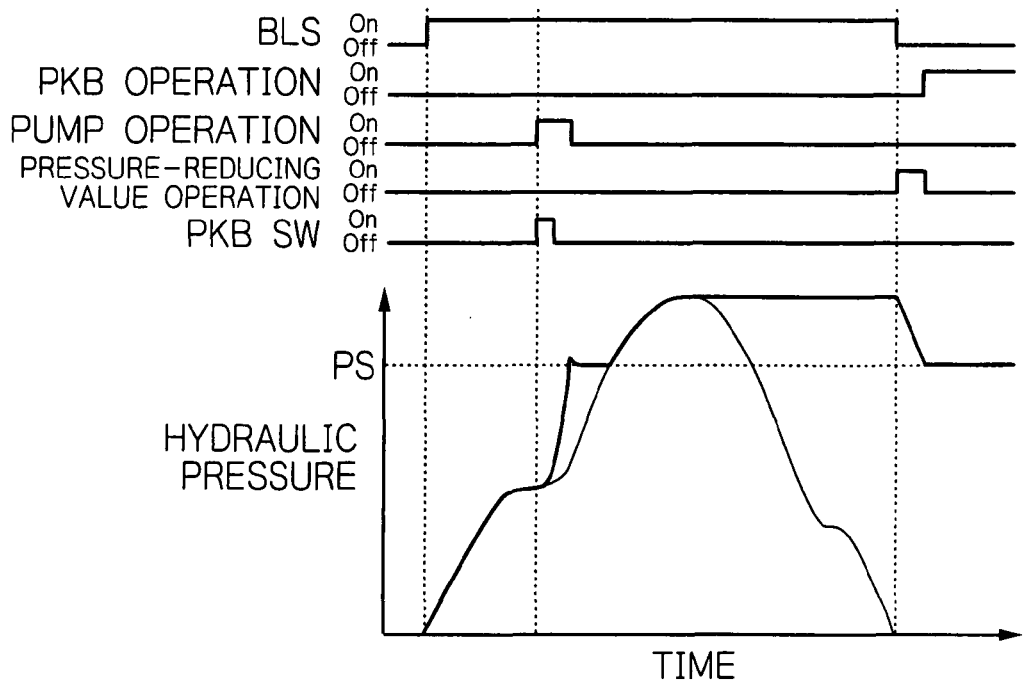
FIG. 13 is a time chart showing another activation timing of each instrument, as the hydraulic pressure in the caliper changes in the third example of control.

FIGS. 11 to 13 show the third example of control in a case in which the brake pedal 4 is being operated when a parking brake indicating signal is input, and a hydraulic pressure is generated in the caliper 14 by the operation of the brake pedal 4. In this case, as shown in FIGS. 11 and 12, if the brake lamp switch 7 is on (S42) when the parking brake switch 8 is turned on (S41), it is determined whether the hydraulic pressure in the caliper 14 is greater than or equal to the predetermined pressure Ps (S43), as in the first example of control. In subsequent step S44, it is determined whether the hydraulic pressure in the caliper 14 is decreasing. If it is decreasing, the main electromagnetic switching valve 60 and supply electromagnetic switching valve 62 are closed in subsequent step S45 to maintain the hydraulic pressure in the caliper 14.

Subsequently, if it is confirmed in step S46 that the brake lamp switch is turned off to detect termination of operation of the brake pedal, then, in subsequent step S47, the pressure-reducing switching valve 68 in the hydraulic control unit 2 is opened. In this way, the hydraulic pressure in the caliper 14 is reduced. If it is confirmed in subsequent step S48 that the hydraulic pressure in the caliper 14 is reduced to the predetermined pressure Ps, the main electromagnetic switching valve 60 and pressure-reducing switching valve 68 are closed in subsequent step S49, and the hydraulic pressure in the caliper 14 is maintained at the predetermined pressure Ps. In subsequent step S50, the electric motor 10 of the disc brake 1 is activated (in normal rotation) to operate the parking brake mechanism 30, thereby moving the nut 35 forward, which in turn presses the piston 25 in the forward-moving direction. If it is confirmed that the electric motor 10 is stalled (S51), the electric motor 10 is turned off (S52). Further, the pressure-reducing switching valve 68 in the hydraulic control unit 2 is opened to release the hydraulic pressure from the caliper 14 (S53), thereby engaging the parking brake.

In this case, even when operation of the brake pedal 4 is unstable, and the hydraulic pressure exerted by this operation varies, the predetermined pressure can be reliably maintained to engage the parking brake.

If it is confirmed in the above step S43 that the hydraulic pressure in the caliper 14 has not reached the predetermined pressure Ps, the process goes to step S54 in which the main electromagnetic switching valve 60 in the hydraulic control unit 2 is closed, and the auxiliary electromagnetic switching valve 65 is opened. At the same time, the pump 66 is operated by the motor 66M to increase the hydraulic pressure in the caliper 14 to the predetermined pressure Ps. This state is maintained until the hydraulic pressure in the caliper 14 is increased by operation of the brake pedal 4 (FIG. 13). If it is confirmed in the above step S42 that the brake lamp switch 7 is not turned on, the process goes to step S55 in which the main electromagnetic switching valve 60 is closed, and the auxiliary electromagnetic switching valve 65 is opened. At the same time, the pump 66 is operated by the motor 66M to increase the hydraulic pressure in the caliper 14. If it is confirmed that the hydraulic pressure has reached the predetermined pressure Ps (S56), the main electromagnetic switching valve 60 and supply electromagnetic switching valve 62 are closed to maintain the hydraulic pressure at the predetermined pressure Ps (S57), and the process goes to step S50.

In the above control examples, signals for indicating that the parking brake switch (PKB SW) 8 is on are used as parking brake indicating signals in steps S1, S21, and S41. However, instead, use can be made of signals from the controller for automatically engaging the parking brake when the brake pedal is kept depressed for a substantial time.

In the above steps S6, S27, and S46, it is confirmed whether the brake lamp switch 7 is turned off, to detect termination of operation of the brake pedal. However, the termination of operation of the brake pedal can instead be detected by the fact that the ignition switch is turned off or that the transmission is shifted into P range. Further, the operation of the brake pedal can be determined to be terminated when a predetermined amount of time has elapsed after the brake lamp switch 7 is turned off.

In the above step S10, S31, or S53, the hydraulic-pressure release operation is conducted by the pressure-reducing switching valve 68. However, the main electromagnetic switching valve 60 and supply electromagnetic switching valve 62 can be opened instead of or together with this operation to release the hydraulic pressure from the caliper 14.

In the above first to third examples of control, as a control method for establishing the parking brake while the brake pedal 4 is being operated, the parking brake is engaged after operation of the brake pedal is finished. However, in the present invention, the parking brake can be engaged even before the operation of the brake pedal is finished or at an instant when the operation of the brake pedal is finished. Below, such a control method will be described. It is to be noted that, in a case in which the parking brake is engaged before the operation of the brake pedal is finished, the brake system shown in FIG. 1 is provided with master hydraulic-pressure sensors 3a and 3a' for detecting a master hydraulic pressure in the master cylinder 3 or its main brake-fluid passages 5 and 5'(Below, description is made in terms of only the master hydraulic pressure sensor 3a in one system).

Figure 14:
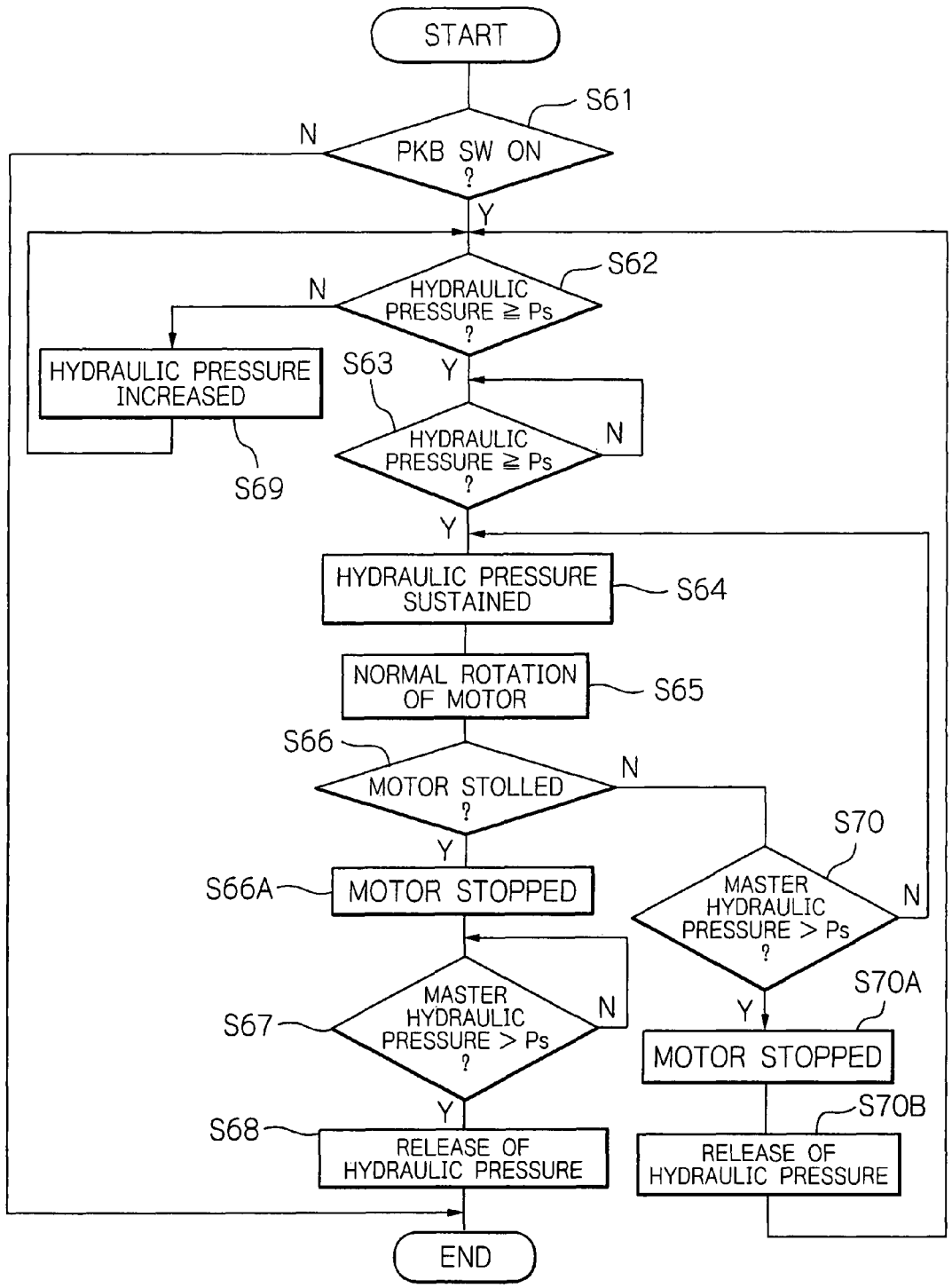
FIG. 14 is a flowchart showing a fourth example of control of the disc brake apparatus.
Figure 15:
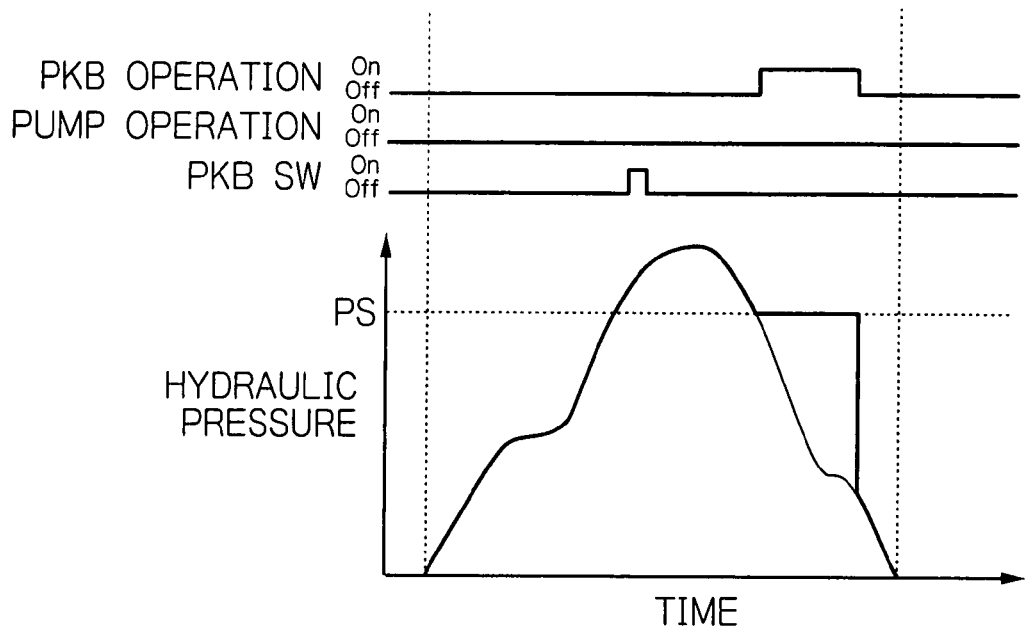
FIG. 15 is a time chart showing an activation timing of each instrument, as the hydraulic pressure in the caliper changes in the fourth example of control.
Figure 16:
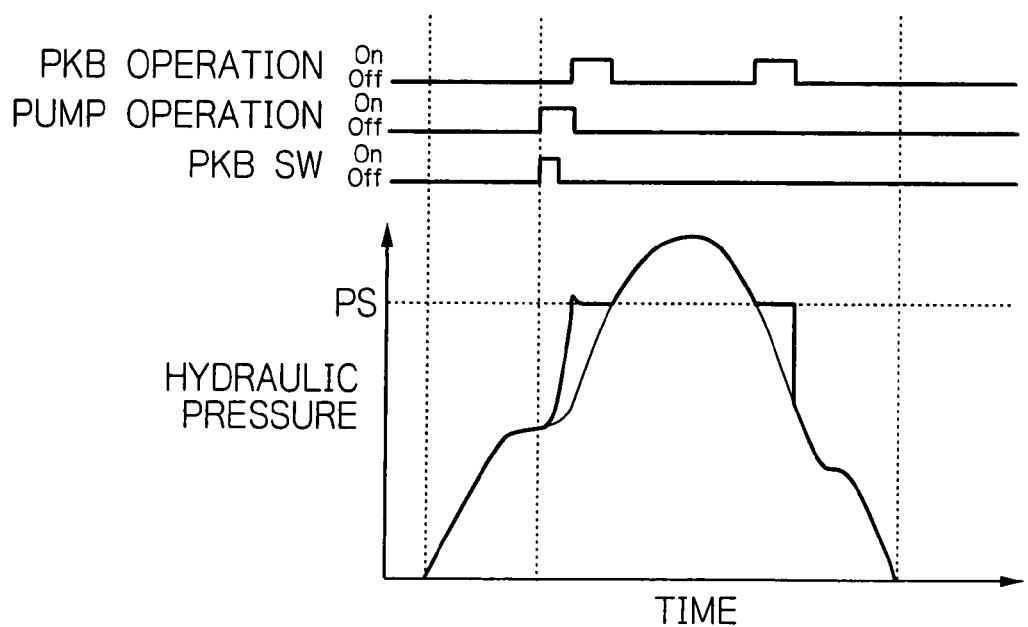
FIG. 16 is a time chart showing another activation timing of each instrument, as the hydraulic pressure in the caliper changes in the fourth example of control.

FIGS. 14 to 16 show a fourth example of control in a case in which the brake pedal 4 is being operated when a parking brake indicating signal is input, and a hydraulic pressure is generated in the caliper 14 by the operation of the brake pedal 4. In this case, as shown in FIGS. 14 and 15, if the brake lamp switch (P K B SW) 8 is on in step S61, it is determined in step S62 whether the hydraulic pressure in the caliper 14 is greater than or equal to the predetermined pressure Ps. If the hydraulic pressure in the caliper 14 is greater than or equal to the predetermined pressure Ps, it is determined in subsequent step S63 whether the hydraulic pressure is reduced to the predetermined pressure Ps. If the hydraulic pressure is reduced to the predetermined pressure Ps, the main electromagnetic switching valve 60 and supply electromagnetic switching valve 62 are closed in subsequent step S64 to maintain the hydraulic pressure in the caliper 14 at the predetermined pressure Ps.

Subsequently, in step S65, the electric motor 10 of the disc brake 1 is activated (in normal rotation) to operate the parking brake mechanism 30, thereby moving the nut 35 forward to press the piston 25 in the forward-moving direction. If it is confirmed that the electric motor 10 is stalled (S66), the electric motor 10 is turned off (S66A). In subsequent step S67, it is determined whether the master hydraulic pressure detected by the master hydraulic pressure sensor 3a is reduced to the predetermined pressure Ps. If the master hydraulic pressure is reduced to the predetermined pressure Ps, the main electromagnetic switching valve 60 and supply electromagnetic switching valve 62 are opened to release the hydraulic pressure from the caliper 14 (S68) to thereby engage the parking brake.

In this case, the parking brake can be engaged even before the operation of the brake pedal is complete. Therefore, the parking brake can be engaged promptly.

If it is confirmed in the above step S62 that the hydraulic pressure in the caliper 14 has not reached the predetermined pressure Ps, the process goes to step S69 in which the main electromagnetic switching valve 60 is closed, and the auxiliary electromagnetic switching valve 65 is opened. At the same time, the pump 66 is operated by the motor 66M to increase the hydraulic pressure in the caliper 14 to the predetermined pressure Ps (FIG. 16). When it is confirmed that the hydraulic pressure has reached the predetermined pressure Ps (S63), the main electromagnetic switching valve 60 and supply electromagnetic switching valve 62 are closed to maintain the hydraulic pressure at the predetermined pressure Ps (S64). If it is determined in the above step S66 that the electric motor 10 is not stalled, the process goes to step S70 in which it is determined whether the master hydraulic pressure detected by the master hydraulic pressure sensor 3a is greater than the predetermined pressure Ps. If the master hydraulic pressure is greater than the predetermined pressure Ps, the electric motor 10 is turned off in step S70A, and the main electromagnetic switching valve 60 and supply electromagnetic switching valve 62 are opened in step S70B so as not to maintain the hydraulic pressure any more. Then the process returns to step S62. On the other hand, if the hydraulic pressure is not greater than the predetermined pressure Ps, the process returns to step S64. As described above, while the electric motor 10 is in operation, it is determined whether the master hydraulic pressure detected by the master hydraulic pressure sensor 3a is greater than the predetermined pressure Ps. If it is, the electric motor 10 is turned off, and the hydraulic pressure is no longer maintained. In this way, the hydraulic pressure in the caliper 14 can be equalized with the master hydraulic pressure in the master cylinder 3, which prevents engagement of the parking brake at a hydraulic pressure greater than or equal to the predetermined pressure Ps and eliminates a need for supplying a high hydraulic pressure at a time of release of the parking brake.

Figure 17:
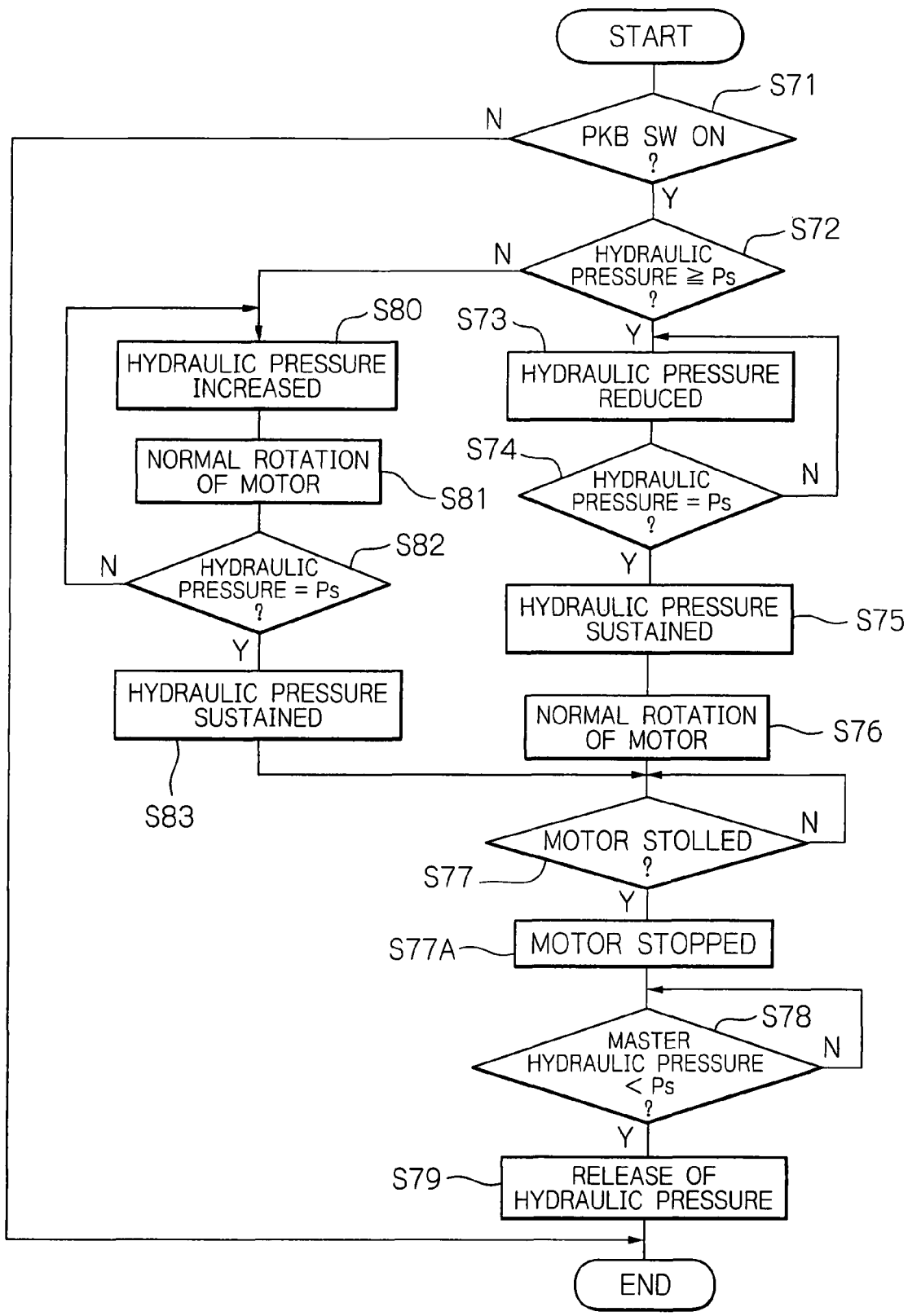
FIG. 17 is a flowchart showing a fifth example of control of the disc brake apparatus.
Figure 18:
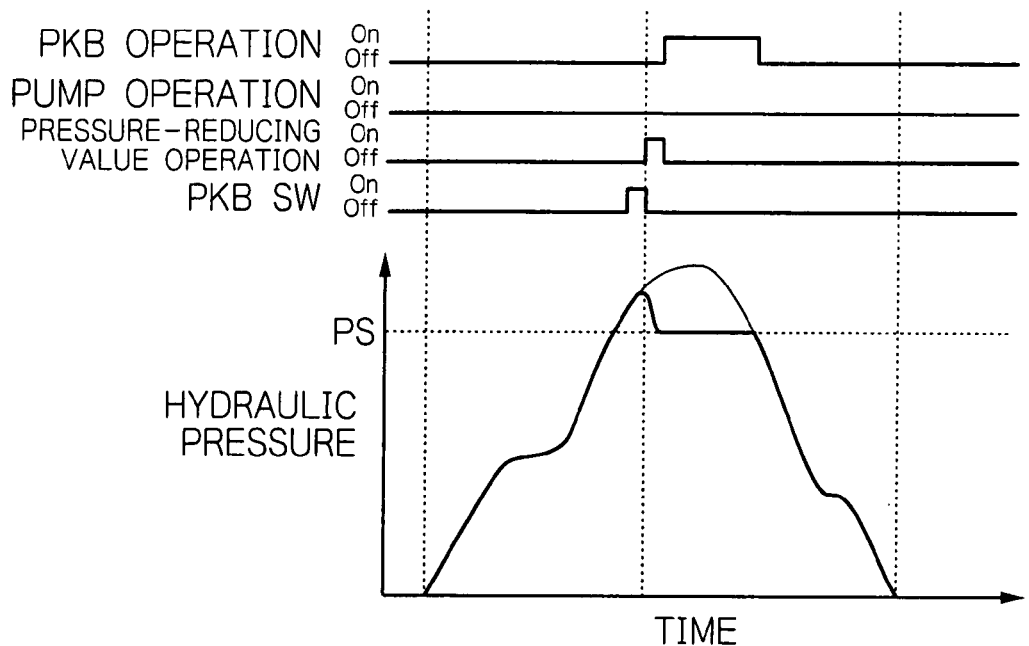
FIG. 18 is a time chart showing an activation timing of each instrument, as the hydraulic pressure in the caliper changes in the fifth example of control.
Figure 19:
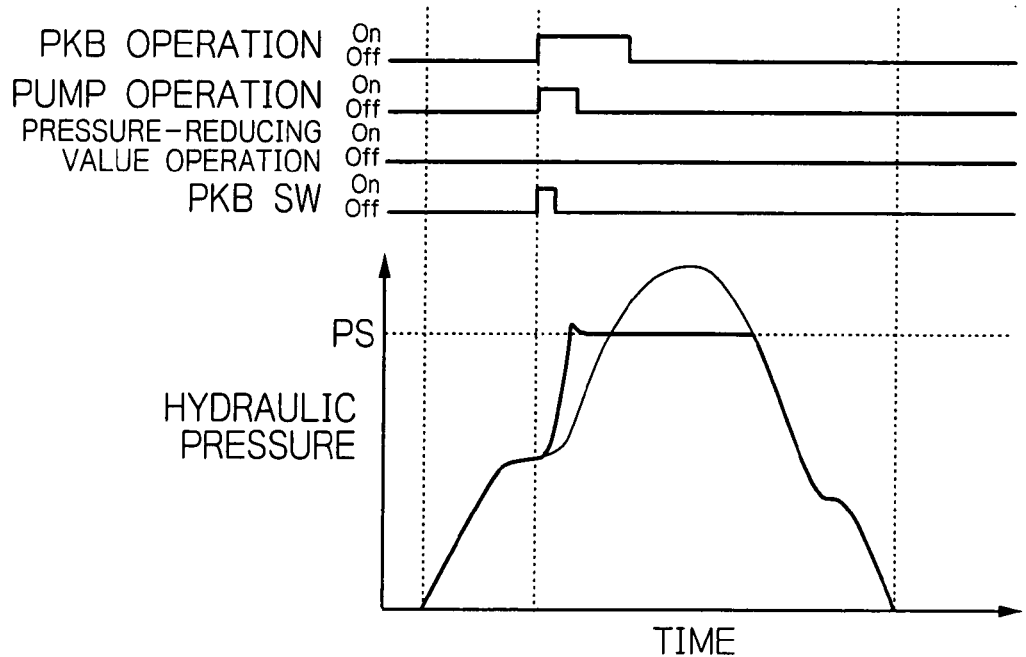
FIG. 19 is a time chart showing another activation timing of each instrument, as the hydraulic pressure in the caliper changes in the fifth example of control.

FIGS. 17 to 19 show the fifth example of control in a case in which the brake pedal 4 is being operated when the parking brake indicating signal is input, and the hydraulic pressure is generated in the caliper 14 by the operation of the brake pedal 4. In this case, as shown in FIGS. 17 and 18, when the parking brake switch 8 is turned on in step S71, it is determined in step S72 whether the hydraulic pressure in the caliper 14 is greater than or equal to the predetermined pressure Ps. If it is determined in step S72 that the hydraulic pressure is greater than or equal to the predetermined pressure Ps, then, in subsequent step S73, the supply electromagnetic switching valve 62 in the control unit 2 is closed, and the pressure-reducing switching valve 68, which is a pressure reducing unit, is opened. In this way, the hydraulic pressure in the caliper 14 is reduced. If it is confirmed in subsequent step S74 that the hydraulic pressure in the caliper 14 is reduced to the predetermined pressure Ps, the main electromagnetic switching valve 60 and pressure reducing electromagnetic switching valve 68 are closed in subsequent step S75 to maintain the hydraulic pressure in the caliper 14 at the predetermined pressure Ps.

Thereafter, as in the fourth example of control, the electric motor 10 of the disc brake 1 is operated in normal rotation (S76). Further, if it is confirmed that the electric motor 10 is stalled (S77), the electric motor 10 is turned off (S77A). Subsequently, it is determined whether the master hydraulic pressure is reduced to the predetermined pressure Ps (S78). If it is, the hydraulic pressure is released from the caliper 14 (S79) to thereby engage the parking brake.

In this case, the hydraulic pressure in the caliper 14 can be reduced to the predetermined pressure Ps by an active pressure-reducing control of the hydraulic control unit 2. Therefore, the parking brake can be engaged more promptly than in the fourth example of control.

If it is confirmed in the above step S72 that the hydraulic pressure in the caliper 14 has not reached the predetermined pressure Ps, the process goes to step S80, in which the main electromagnetic switching valve 60 is closed, and the auxiliary electromagnetic switching valve 65 is opened. At the same time, the pump 66 is operated by the motor 66M to increase the hydraulic pressure in the caliper 14. Further, the electric motor 10 of the disc brake 1 is operated in normal rotation in step S81. Thereafter, if it is confirmed in subsequent step S82 that the hydraulic pressure in the caliper 14 is increased to the predetermined pressure Ps, the hydraulic pressure is maintained in subsequent step S83, and the process returns to the above step S77.

Figure 20:
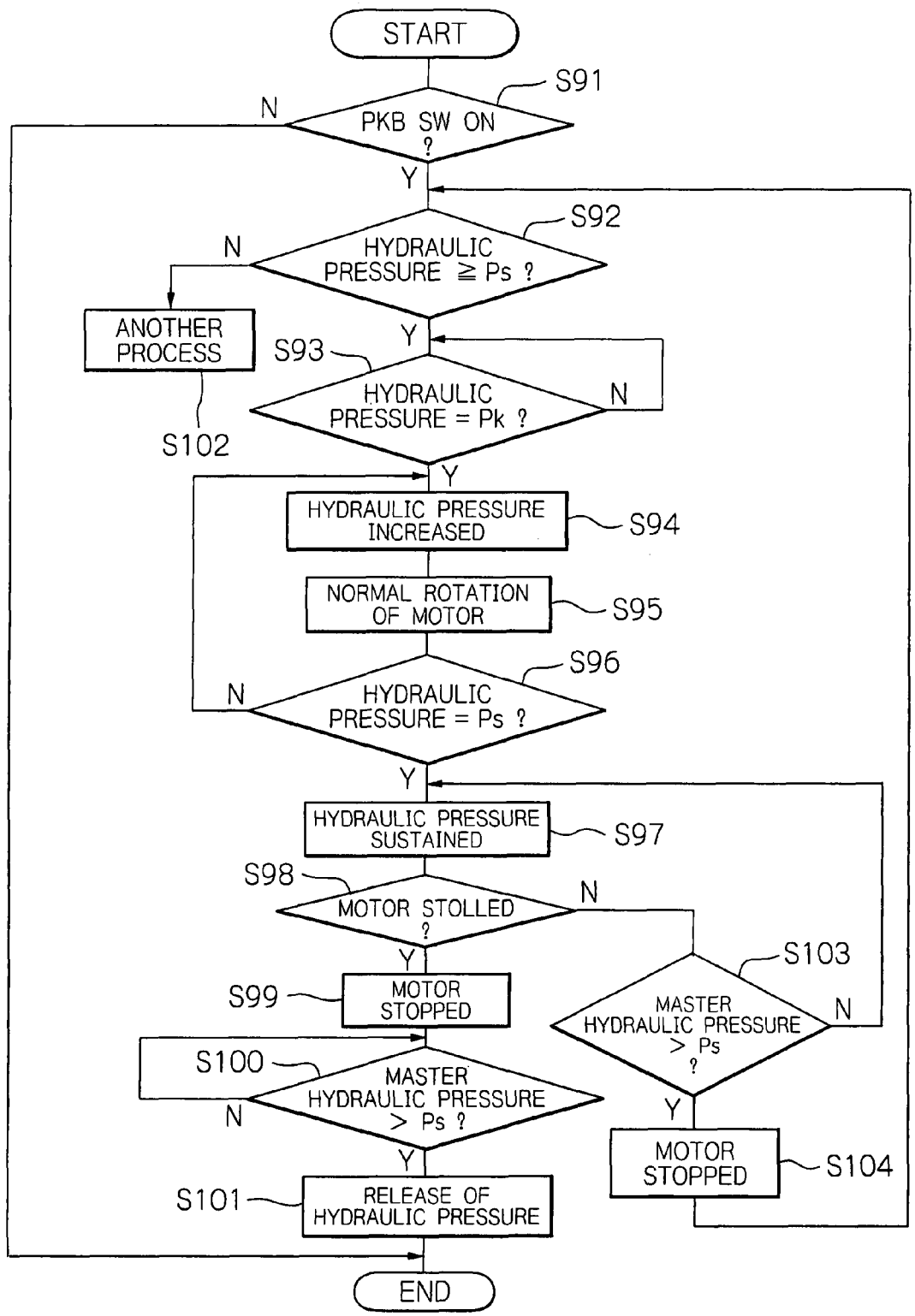
FIG. 20 is a flowchart showing a sixth example of control of the disc brake apparatus.
Figure 21:
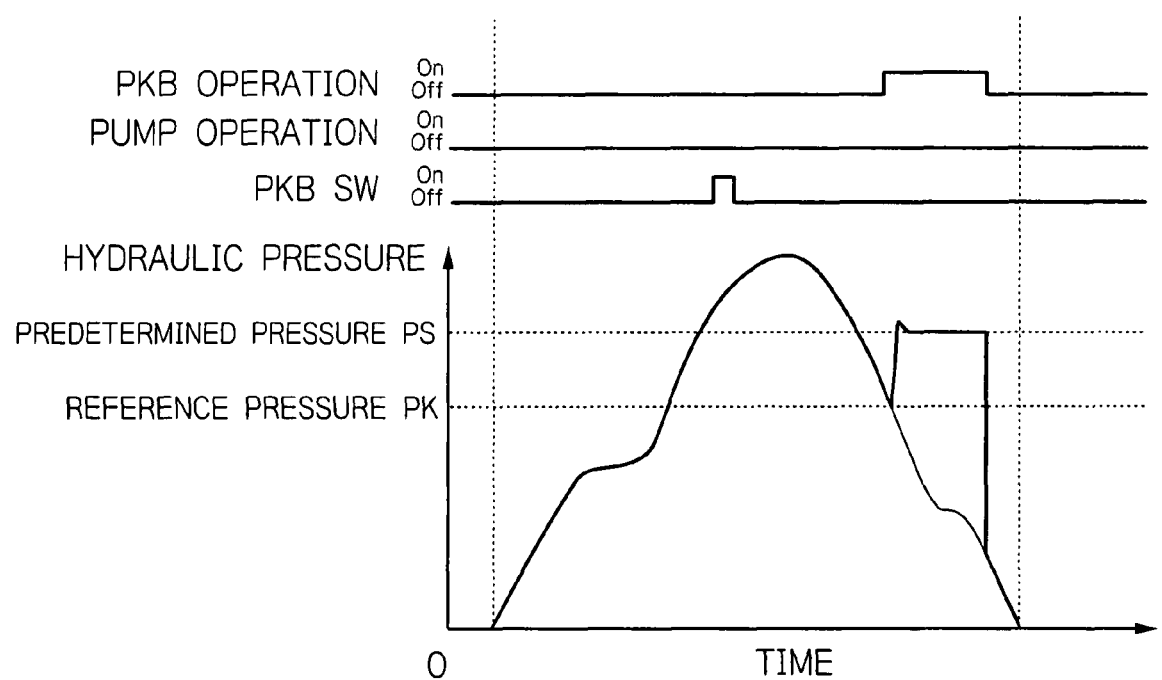
FIG. 21 is a time chart showing an activation timing of each instrument, as the hydraulic pressure in the caliper changes in the sixth example of control.

FIGS. 20 and 21 show the sixth example of control in a case in which the brake pedal 4 is being operated when a parking-brake indicating signal is input, and a hydraulic pressure is generated in the caliper 14 by the operation of the brake pedal 4. In this case, as shown in FIGS. 20 and 21, when the parking brake switch (PKB SW) 8 is turned on in step S91, it is determined in step S92 whether the hydraulic pressure in the caliper 14 is greater than or equal to the predetermined pressure Ps. If the hydraulic pressure in the caliper 14 is greater than or equal to the predetermined pressure Ps, it is determined in subsequent step S93 whether the hydraulic pressure is reduced to a reference pressure Pk (predetermined pressure Ps>reference pressure Pk>about one half of the predetermined pressure Ps) lower than the predetermined pressure Ps. If the hydraulic pressure is reduced to the reference pressure Pk in step S93, the pump 66 is operated in subsequent step S94. In step S95, the electric motor 10 of the disc brake 1 is activated (in normal rotation) to operate the parking brake mechanism 30, thereby moving the nut 35 forward to pressure the piston 25 in the forward-moving direction. In the meantime, it is promptly determined in step S96 whether the hydraulic pressure is increased to the predetermined pressure Ps. Upon reaching the predetermined pressure Ps, the main electromagnetic switching valve 60 and supply electromagnetic switching valve 62 are closed in step S97 to maintain the hydraulic pressure in the caliper 14 at the predetermined pressure Ps.

Thereafter, when it is confirmed that the electric motor 10 is stalled (S98), the electric motor 10 is stopped (S99). Further, it is determined whether the master hydraulic pressure is reduced to the predetermined pressure Ps (S100). If it is, the main electromagnetic switching valve 60 and supply electromagnetic switching valve 62 are opened to discharge the hydraulic pressure from the caliper 14 (S101), thereby engaging the parking brake.

In this case, the parking brake can be engaged before the operation of the brake pedal is finished. Therefore, the parking brake can be engaged promptly. Another process in step S102 is the same as that in steps S80 to S83 of the fifth example of control (FIG. 17). If it is determined in the above step 98 that the electric motor 10 is not stalled, the process goes to steps S103 and S104 which are the same as the steps S70 to S70B of the fourth example of control (FIG. 14) (The process corresponding to S70B is omitted from FIG. 20).

In the above fourth to sixth examples of control, the parking brake can be engaged before the operation of the brake pedal is finished. Therefore, the parking brake can be engaged promptly.

In the above fourth to sixth examples of control, as a condition for the release of hydraulic pressure in steps S68, S79, and S101, it is required that the master hydraulic pressure be reduced to the predetermined pressure Ps in steps S67, S78, and S100. However, instead, the hydraulic pressure can be released in step S68, S79, and S101 when it is detected that the brake lamp switch 7 for indicating termination of the operation of the brake pedal in step S6 and so on is turned off, as in the first to third examples of control. In this way, the parking brake can be engaged at an instant when the operation of the brake pedal is finished.

In the fourth to sixth examples of control, the hydraulic pressure is released by opening the main electromagnetic switching valve 60 and supply electromagnetic switching valve 62 in steps S68, S79, and S101. However, the hydraulic pressure can be released from the caliper 14 by opening the pressure reducing switching valve 68 in the hydraulic control unit 2, instead of or together with the above steps.

In the above first to sixth examples of control, the electric motor 10 is used as an electric actuator of the parking brake mechanism, as shown in FIGS. 2 and 3. However, instead, an electromagnetic solenoid can be used for example, as disclosed in Japanese Patent Public Disclosure No. 2006-17193. Further, the parking brake mechanism itself is not limited to the one shown in FIGS. 2 and 3 as long as a piston can be mechanically held in a braking position by an electric actuator after a brake is engaged by a supply of hydraulic pressure to the piston. Similarly, the circuit structure of the hydraulic circuit is not limited to the one shown in FIG. 4.

According to the disc brake apparatus of the present invention, the parking brake can be engaged always by a predetermined hydraulic pressure, independent of a hydraulic pressure exerted by operation of a brake pedal. This reduces an amount of time required to release the parking brake. As a result, reliability of the apparatus can be improved significantly.

In a case in which the brake pedal is operated when a parking-brake indicating signal is input to the controller, the controller of the disc brake device with the above-mentioned structure operates the parking brake mechanism in a state in which a hydraulic pressure in the caliper is at a predetermined pressure, after the operation of the brake pedal is finished. Therefore, it is not necessary to increase a hydraulic pressure supplied from a hydraulic circuit to a caliper body at a time of release of a parking brake, to greater than the predetermined pressure. Thus an amount of time required to release the parking brake can be reduced.

According to the first to fourth examples of control, a hydraulic pressure exerted by operation of a brake pedal is reduced to the predetermined pressure, and then the predetermined pressure is maintained. This eliminates a need for an active pressure-reducing control by the hydraulic circuit and facilitates the control accordingly.

According to the second to fifth examples of control, the hydraulic pressure is reduced to the predetermined pressure by an active pressure-reducing control of the hydraulic circuit. Therefore, the parking brake can be engaged promptly.

According to the third example of control, even when a hydraulic pressure exerted by the brake pedal varies due to unstable operation of the brake pedal, the predetermined pressure can be reliably maintained to engage the parking brake.

The above-described embodiment is characterized in that, when a hydraulic pressure in the caliper is lower than a predetermined pressure, the controller performs a pressure-increasing control of the hydraulic circuit to supply a predetermined amount of pressure to the caliper. In this case, the parking brake mechanism can be reliably operated with a predetermined pressure by controlling of the hydraulic circuit to increase the hydraulic pressure, so as to stably engage the parking brake.

In a case that the hydraulic circuit uses a hydraulic control unit in a brake system having a mechanism for generating a hydraulic pressure, the hydraulic control unit can be utilized effectively in the brake system without a need for a special hydraulic circuit.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2006-236733, filed on Aug. 31, 2006. The entire disclosure of Japanese Patent Application No. 2006-236733, filed on Aug. 31, 2006 including specification, claims, drawings and summary is incorporated herein by reference in its entirety.

The Japanese Domestic Announcement No. 05(1993)-506196 is incorporated herein by reference in its entirety.

The Japanese Laid Open Publication No. 2006-17193 is incorporated herein by reference in its entirety.

What is claimed is:
1. A disc brake apparatus comprising:
a pair of pads disposed on opposite sides of a disc;
a caliper for moving forward a piston slidably disposed in a cylinder having a closed end, using a hydraulic pressure supplied by operation of a brake pedal, thereby pressing the pair of pads against the disc to exert a brake force;
a parking brake mechanism operated by an electric actuator as a drive source to mechanically hold the piston, which has been moved forward by the hydraulic pressure supplied from a hydraulic circuit into the caliper, in a braking position even after the hydraulic pressure is released; and
a controller for activating the hydraulic circuit, based on a parking-brake indicating signal, to supply a predetermined hydraulic pressure into the caliper, and for operating the parking brake mechanism to hold the piston in the braking position,
wherein, when the hydraulic pressure in the caliper exceeds the predetermined pressure and the parking-brake indicating signal is input to the controller to initiate a parking brake operation to hold the piston in the braking position, the controller does not operate the parking brake mechanism to hold the piston in the braking position by the parking brake mechanism.

2. A disc brake apparatus according to claim 1, wherein
when the hydraulic pressure in the caliper exceeds the predetermined pressure and the parking-brake indicating signal is input to the controller, the controller operates the parking brake mechanism, after the hydraulic pressure is reduced to the predetermined pressure, to hold the piston in the braking position at the predetermined pressure.

3. A disc brake apparatus according to claim 2, wherein
when the hydraulic pressure in the caliper exceeds the predetermined pressure while the electric actuator is being operated to hold the piston in the braking position by the parking brake mechanism at the predetermined pressure, the controller stops operation of the electric actuator of the parking brake mechanism.

4. A disc brake apparatus according to claim 2, wherein the controller controls the hydraulic circuit to reduce the hydraulic pressure in the caliper to the predetermined pressure and then maintain at the predetermined pressure.

5. A disc brake apparatus according to claim 4, wherein
when the hydraulic pressure in the caliper exceeds the predetermined pressure while the controller operates the electric actuator to hold the piston in the braking position by the parking brake mechanism at the predetermined pressure, the controller stops operation of the electric actuator of the parking brake mechanism.

6. A disc brake apparatus according to claim 1, wherein
when the hydraulic pressure in the caliper exceeds the predetermined pressure and the parking-brake indicating signal is input to the controller, the controller operates the hydraulic circuit, after the hydraulic pressure is reduced to a reference pressure that is lower than the predetermined pressure, to increase the hydraulic pressure to the predetermined pressure, so as to hold the piston in the braking position by the parking brake mechanism at the predetermined pressure.

7. A disc brake apparatus according to claim 1, wherein
when the hydraulic pressure in the caliper exceeds the predetermined pressure while the controller operates the electric actuator to hold the piston in the braking position by the parking brake mechanism at the predetermined pressure, the controller stops operation of the electric actuator of the parking brake mechanism.

8. A disc brake apparatus according to claim 1 further comprising a pressure reducing unit for reducing a hydraulic pressure in the caliper, wherein
when the hydraulic pressure in the caliper exceeds the predetermined pressure and the parking-brake indicating signal is input to the controller, the controller operates the pressure reducing unit to reduce the hydraulic pressure to the predetermined pressure, so as to hold the piston in the braking position by the parking brake mechanism at the predetermined pressure.

9. A disc brake apparatus according to claim 8, wherein
the controller controls the hydraulic circuit, to reduce the hydraulic pressure in the caliper to the predetermined pressure and thereafter to maintain the hydraulic pressure in the caliper at the predetermined pressure.

10. A disc brake apparatus according to claim 1 further comprising a pressure reducing unit for reducing a hydraulic pressure in the caliper, wherein
when the hydraulic pressure in the caliper exceeds the predetermined pressure and the parking-brake indicating signal is input to the controller, the controller operates the pressure reducing unit to reduce the hydraulic pressure to a reference pressure that is lower than the predetermined pressure and thereafter operates the hydraulic circuit to increase the hydraulic pressure to the predetermined pressure, to hold the piston in the braking position by the parking brake mechanism at the predetermined pressure.

11. A disc brake apparatus according to claim 1, wherein
when the hydraulic pressure in the caliper is lower than the predetermined pressure and the parking-brake indicating signal is input to the controller, the controller performs a pressure-increasing control of the hydraulic circuit to supply the predetermined hydraulic pressure to the caliper.

12. A disc brake apparatus according to claim 1, wherein said hydraulic circuit is a hydraulic control unit in a brake system including a vehicle dynamic control system, an antilock brake system, or a traction control system, and wherein the brake system includes a mechanism for generating a hydraulic pressure.

13. A disc brake apparatus comprising:
a pair of pads disposed on opposite sides of a disc;
a caliper for moving forward a piston slidably disposed in a cylinder having a closed end, using a hydraulic pressure supplied by operation of a brake pedal, thereby pressing the pair of pads against the disc to exert a brake force;
a parking brake mechanism operated by an electric actuator as a drive source to mechanically hold the piston in a braking position at which the pair of pads is pressed against the disc; and
a controller for operating the parking brake mechanism to hold the piston in the braking position, in response to an input of a parking-brake indicating signal,
wherein, when the hydraulic pressure in the caliper exceeds the predetermined pressure and the parking-brake indicating signal is input to the controller to initiate a parking brake operation to hold the piston in the braking position, the controller does not operate the parking brake mechanism to hold the piston in the braking position by the parking brake mechanism.

14. A disc brake apparatus according to claim 13, wherein
when the hydraulic pressure in the caliper exceeds the predetermined pressure and the parking-brake indicating signal is input to the controller, the controller operates the parking brake mechanism, after the hydraulic pressure is reduced to the predetermined pressure, to hold the piston in the braking position.

15. A disc brake apparatus according to claim 13, wherein
when the hydraulic pressure in the caliper exceeds the predetermined pressure while the controller operates the electric actuator to hold the piston in the braking position by the parking brake mechanism, the controller stops operation of the electric actuator of the parking brake mechanism.

16. A disc brake apparatus according to claim 13, wherein the parking brake mechanism comprises:
a reduction mechanism driven by the electric actuator to rotate, and
a moving mechanism configured to convert the rotation of the reduction mechanism to a linear motion to move the piston to the braking position.

* * * * *